United States Patent
Kasmir

(10) Patent No.: US 11,380,173 B2
(45) Date of Patent: Jul. 5, 2022

(54) ELIMINATING MECHANICAL CHIME HUM

(71) Applicant: Alarm.com Incorporated, Tysons, VA (US)

(72) Inventor: Seton Paul Kasmir, San Diego, CA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 17/076,742

(22) Filed: Oct. 21, 2020

(65) Prior Publication Data
US 2021/0118270 A1 Apr. 22, 2021

Related U.S. Application Data

(60) Provisional application No. 62/923,902, filed on Oct. 21, 2019.

(51) Int. Cl.
*G08B 3/10* (2006.01)
*H04N 7/18* (2006.01)

(52) U.S. Cl.
CPC .............. *G08B 3/10* (2013.01); *H04N 7/186* (2013.01)

(58) Field of Classification Search
CPC .................................... G08B 4/10; H04N 7/18
USPC ......................................................... 340/328
See application file for complete search history.

(56) References Cited

U.S. PATENT DOCUMENTS

| 7,023,327 | B1 | 4/2006 | Chen |
| 7,417,535 | B2 | 8/2008 | Mathews et al. |
| 7,477,134 | B2 | 1/2009 | Langer et al. |
| 7,764,775 | B2 | 7/2010 | Tarkoff et al. |
| 9,172,920 | B1 | 10/2015 | Kasmir et al. |
| 10,062,251 | B2 | 8/2018 | Kasmir et al. |
| 2020/0005604 | A1* | 1/2020 | Long ...................... G08B 29/10 |
| 2020/0388118 | A1* | 12/2020 | Rosenberg ............... G08B 3/10 |

* cited by examiner

*Primary Examiner* — Melur Ramakrishnaiah
(74) *Attorney, Agent, or Firm* — Fish & Richardson P.C.

(57) ABSTRACT

A circuit is described for powering a video doorbell in signal communication with a chime that outputs audio in response to a button on the video doorbell being pressed. The circuit includes a rectifier circuit configured to: i) receive a first voltage signal generated based on a power source and ii) generate a second voltage signal based on the first voltage signal. The circuit includes a boost circuit that generates a high-voltage direct-current (DC) signal for charging a capacitor without generating a peak current that triggers a particular noise output from the chime. The circuit also includes a converter circuit that generates a low-voltage power signal based on the high-voltage DC signal and a charge stored at the capacitor. The low-voltage power signal is for powering a plurality of components of the video doorbell.

20 Claims, 14 Drawing Sheets

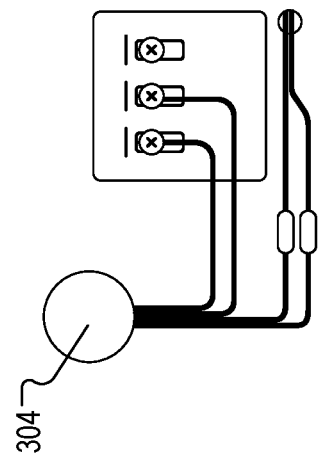
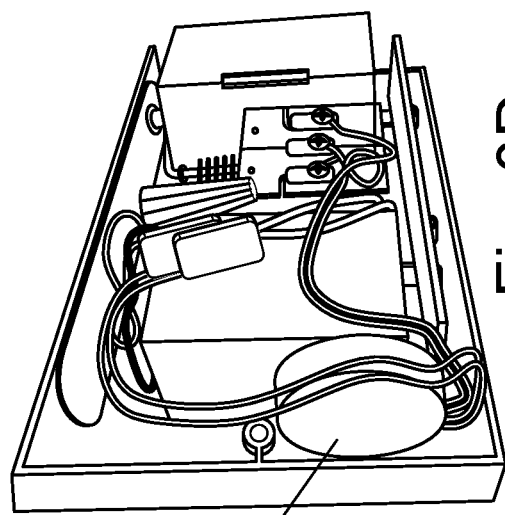
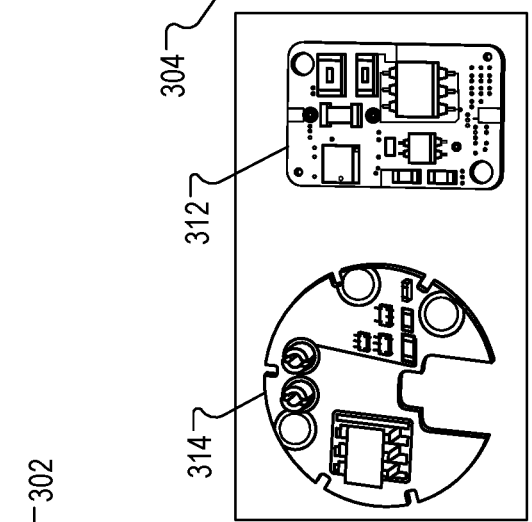
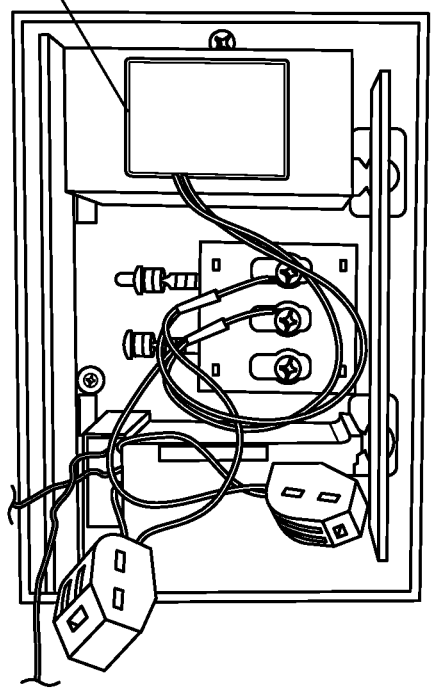
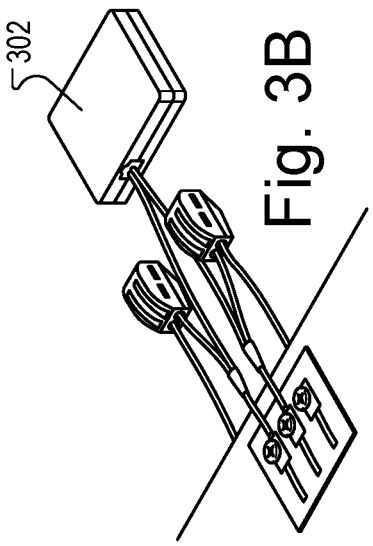

ELIMINATING MECHANICAL CHIME HUM

CROSS REFERENCE TO RELATED APPLICATION

This application claims the benefit of U.S. Provisional Application No. 62/923,902, filed on Oct. 21, 2019, which is incorporated herein by reference in its entirety.

FIELD

This specification relates to circuitry used in doorbells for a property or residence.

BACKGROUND

Doorbells and related monitoring devices are often used at various types of properties, such as a home or commercial business. These doorbells and related devices can be implemented in different ways when installed at a particular location of the property. Some doorbells include hardware circuitry that provide different types of monitoring and control functionality. The functionality afforded by these doorbells, and their respective hardware circuitry, can include wireless and audio signal transmissions, which can be leveraged to monitor persons or items at a property as well as to obtain visual information about the items and communicate with persons at property.

A Wi-Fi video doorbell is a relatively new product category. The video doorbell replaces the doorbell button found on homes. Consumers and service providers want to reuse the existing doorbell components and wiring to save installation time and cost. Installation uses the existing wiring, alternating-current (AC) transformer, and an indoor chime. Often an installer or home owner does not know the whereabouts and cannot locate the existing doorbell's AC transformer. It may be helpful if installation was just replacing the mechanical doorbell button with a video doorbell. However, this typically is not the case.

SUMMARY

This document describes techniques for an improved video doorbell that includes hardware circuitry configured to eliminate unwanted humming that can occur when a video doorbell is installed at a property.

Video doorbells can be specifically designed to use or reuse an AC step down transformer. These transformers may be properly wired to power the chime and the front door. Often times, an installer or home owner does not know the whereabouts and cannot locate the transformer in the home. In some instances, the existing external transformer dictates the structure used in the internal power supplies of video doorbells. This power structure creates large narrow peak currents that cause the existing mechanical chime to emit a hum. Because of this hum home owners and installers are required to install, inside the home and on the existing chime, a bypass circuit. This requirement of a bypass circuit adds time and cost to the installation and involves an installer having to work inside the home to install the bypass circuit. This effort of installing the bypass circuit is in addition to the separate task of mounting the video doorbell on the outside of the home.

In view of the above, techniques are described for an improved internal power supply design of a video doorbell. More specifically, this document describes techniques for implementing a video doorbell that includes hardware circuitry for an improved regulated AC power supply design. The hardware circuitry of the power supply includes a unique implementation of switching power supply technology for outputting direct-current (DC) power signals from converted AC power signals. The power supply can be adapted to receive a first AC power signal (e.g., 110 VAC) and output a second, converted AC power signal based on the first AC power signal. Based on this implementation, the power supply is configured to eliminate or substantially reduce the mechanical chime hum (e.g., unwanted humming) that can occur when a video doorbell is installed at a property. Elimination or substantial reduction of the chime hum using the disclosed power supply design can thus eliminate the need to install a bypass circuit at the property, which reduces the cost and installation time required to install video doorbell.

Further, the unique use of switching power supply technology for outputting AC or DC power signals provides a new type of AC power supply that can be used to replace existing doorbell transformers. The AC output of this new power supply differs from the traditional sinusoidal AC output waveform. For example, the described power supply design results in fewer current spikes and can be used to power both current and newer generation video doorbells, such as video doorbells that include more advanced video doorbells features (e.g., machine-learning/AI applications and facial recognition) that often require higher amounts of power. This aspect of the power supply design contributes to the reduction of the mechanical hum and therefore enables existing and newer video doorbells to be installed and used without a disruptive chime humming sound.

Other implementations of this and other aspects include corresponding systems, apparatus, and computer programs, configured to perform the actions of the methods, encoded on computer storage devices. A computing system of one or more computers or hardware circuits can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The subject matter described in this specification can be implemented in particular embodiments to realize one or more of the following advantages.

The technology described in this specification decreases the cost of installing the video doorbell. Installation of a video doorbell becomes easier, simpler, and less intrusive to a consumer, if the installation operation required in the case of a mechanical chime is to remove and replace the doorbell button with a video doorbell. The disclosed techniques do not require a technician to enter the home to install a bypass, which is time consuming and can be intrusive to a customer. Thus, eliminating the requirement of a bypass on the chime lowers installation cost and eliminates the cost of supplying the bypass circuit with its circuit board, electronic components, plastic housing and connectors which is also not insignificant cost adder.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIGS. 3A-3E illustrate examples of bypass circuits for a video doorbell.

Like reference numbers and designations in the various drawings indicate like elements.

DETAILED DESCRIPTION

Figure 1:
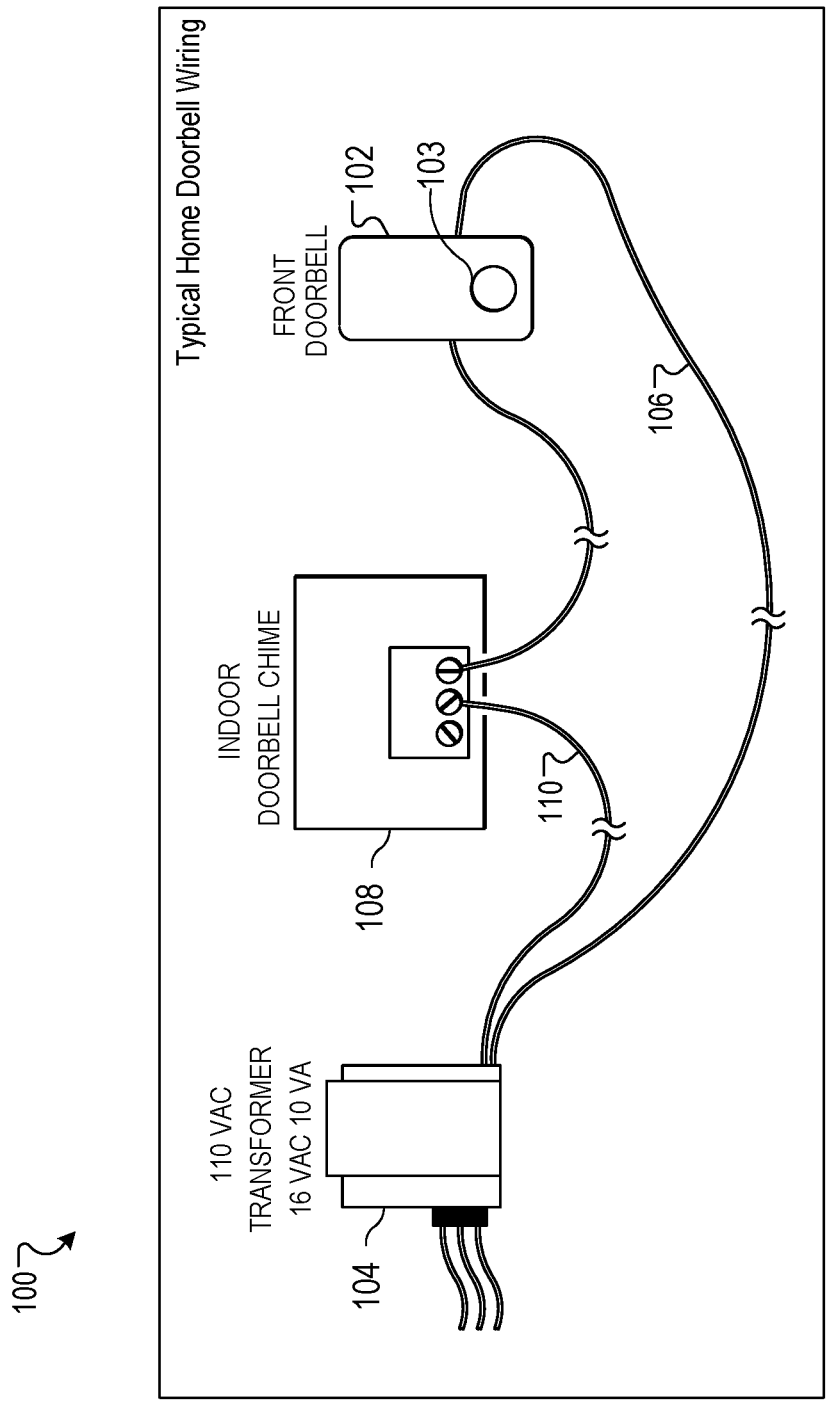
FIG. 1 illustrates an example home doorbell wiring diagram.

FIG. 1 illustrates an example home doorbell wiring diagram 100. As shown, the front doorbell 102 has a button 103 which is a mechanical switch that may be mounted on the outside of a property, such as a house (or other structure), and is connected to both a transformer 104 by one wire 106 and an indoor chime 108. In some cases, front doorbell button 103 is referred to alternatively as switch 103. The indoor chime 108 can be a mechanical chime or an electronic chime. The front doorbell button 103 is open until a person presses it. In other words, the front doorbell button 103 corresponds to a normally open switch of a circuit in the front doorbell, where the switch closes in response to the front doorbell button 103 being pressed or depressed by a user. Pressing the front doorbell button 103 closes the switch and completes a portion of the doorbell circuit so that power 110 supplied by the transformer 104 is applied to the indoor chime 108. This application of transformer power to the indoor chime 108 causes the familiar doorbell sound such as "ding dong."

Figure 2:
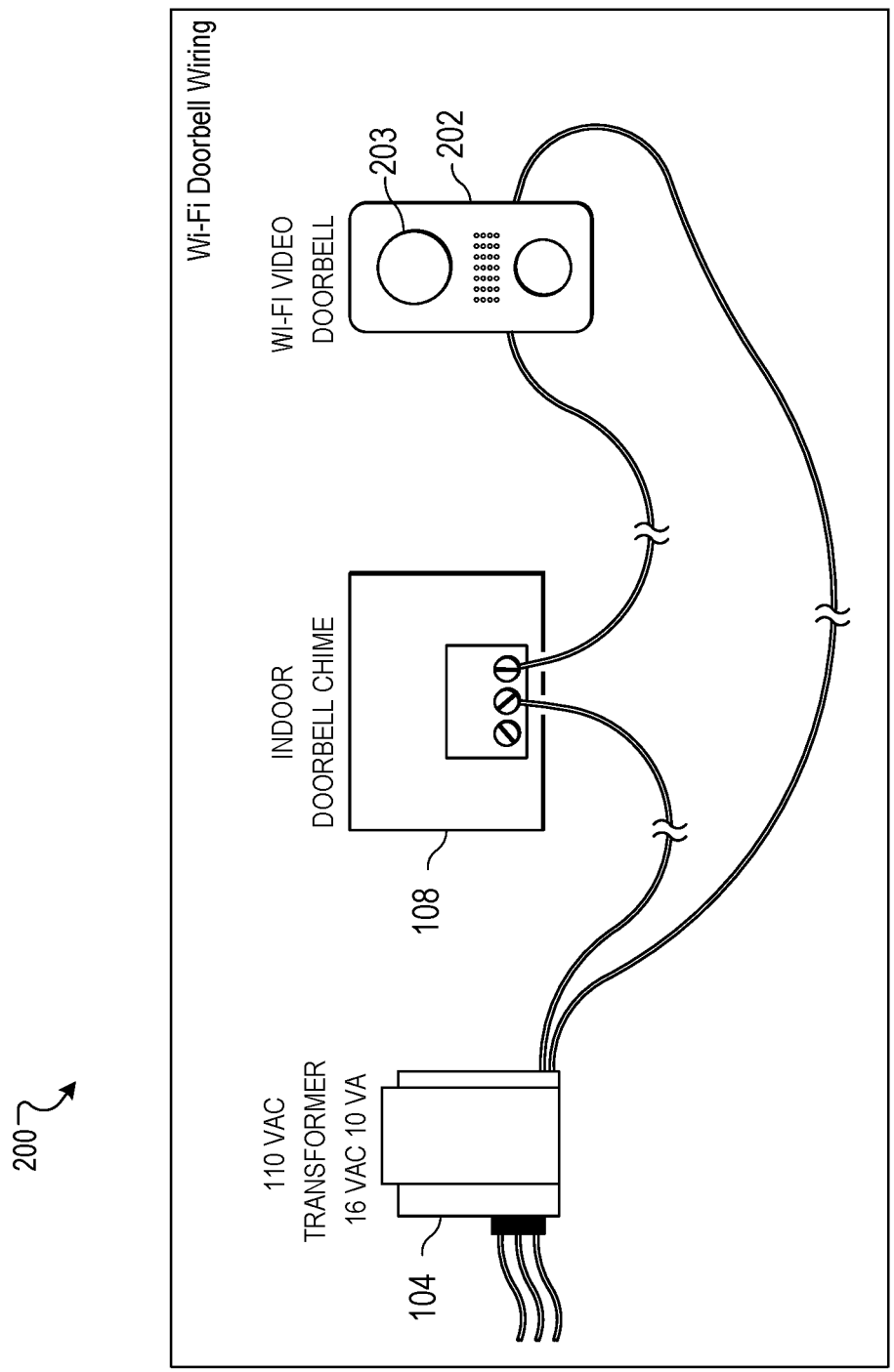
FIG. 2 illustrates an example home doorbell wiring diagram where a video doorbell replaces a mechanical doorbell switch mounted on a property.

FIG. 2 illustrates an example home doorbell wiring diagram 200 where a video doorbell 202 (e.g., a Wi-Fi video doorbell) replaces the mechanical switch/button 103 of the front doorbell mounted on the property and is able to draw power from the transformer 104 via two wired output connections. In the example of FIG. 2 one transformer output connection travels through wiring resistance inside the chime of a mechanical chime 208, and the other output is connected by a wire 106 directly to the transformer. The resistance of the mechanical chime 108 may be, for example, six to eight ohms.

The video doorbell 202 mimics the mechanical switch 103 when its button 203 is pressed by shorting the two external wires together, which applies some or all of the power output to the mechanical chime 108, making the ding dong sound. When the doorbell 202 is not ringing, the circuit is not open like the example switch circuit of the mechanical front doorbell 102, but instead, doorbell 202 uses some amount of power that is lower than an amount of power required to ring the indoor chime 108. The two states for voltage across the doorbell 202 is normal operation where greater than 90 percent of the voltage corresponding to the transformer output power is across the doorbell 202. For example, if 20.5 Volts RMS is supplied from the transformer, the voltage across the doorbell 202 will be about 20 Volts RMS.

The other operational state of doorbell 202 is where electronically, the doorbell 202 shorts its two input wires to simulate a button press. When this occurs, there may be little to no voltage across the doorbell 202. Normal operation of the doorbell 202 also includes powering on and booting up, going offline, configuring of the doorbell 202 via an application on an example mobile device such as a smart phone or tablet, and being in an active operational state or being in an inactive, but alive, operational state. The impedance of the chime 108 or the chime bypass may be less than the video doorbell 202 so that under any state other than ringing, most of the voltage from the output of transformer 104 is applied across the doorbell 202.

Unlike mechanical chimes, electronic chimes do not allow for a sufficient amount of current to flow through the chime toward the doorbell 202. This limits or prevents a video doorbell from working in series with the electronic chime and the transformer 104. Instead, the electronic chime appears as a very high resistance such that all the voltage is applied to the electronic chime, which results in no voltage and insufficient current to operate the video doorbell.

For the video doorbell to work, something else must be done to the wired circuit. In some implementations, to complete the circuit when there is an electronic chime, a bypass circuit may be utilized. The bypass circuit can be used to power down the electronic chime and then wake up the chime with a signal that will ring it only when it needs to be used. There are several examples of bypass circuits for the electronic chime. In general, a bypass circuit bypasses the chime such that most of the power goes directly to the doorbell 202 (e.g., video doorbell) without having to travel through the electronic chime 108.

In some cases, current bypass circuits for electronic or mechanical chimes allow some energy to pass through the chime, e.g., by not causing a complete short across it. The shorting part has some additional series resistor and both are applied to the chime directly not just the short part. Because some doorbells may require large amounts of power, this power or energy that passes through the mechanical chime may still cause unwanted hums or noise in some installations. In some cases, the bypass circuit can be modified so that no current flows through the chime 108. This is relevant because the power losses that result from the chime 108 make it difficult to power the doorbell 202, particularly when the total power required by the doorbell, plus the wasted power, is greater than the power output of transformer.

The bypass circuit can detect when the video doorbell 202 intends to ring it by the video doorbell shorting together its input wires and the bypass circuit detecting that the transformer 104 voltage is now near fully applied to the chime. During normal operation when the chime 108 is being rung, the bypass circuit has a solid-state relay that is normally closed which shorts (bypasses) the electronic chime's two wires together. This keeps most of the power from flowing to the electronic chime 108. When the video doorbell 202 wants to ring the chime 108, the doorbell 202 shorts its wires together which applies the transformer 104 voltage to the bypass circuit. In addition to the relay on the bypass, there is a diode bridge whose DC output suddenly rises when most of the transformer voltage is applied to the bypass. This rise in the applied DC voltage causes the bridge diode output to create a current to flow to the control port of the solid-state relay which then opens the relay. The opening of the relay removes the short across the chime 108. When the relay is open, it is no longer bypassing the chime. Upon opening the relay, the transformer power is now applied to the chime causing it to produce the ring sound, such as ding dong.

Each of FIGS. 3A-3E illustrate examples of bypass circuits for a video doorbell. More specifically, each of FIG. 3A and FIG. 3B illustrate an example system that includes a device 302, which encloses an example bypass circuit 312 illustrated in FIG. 3C. Likewise, each of FIG. 3D and FIG. 3E illustrate an example system that includes a device 304, which encloses an example bypass circuit 314 illustrated in FIG. 3C.

In some implementations, a video doorbell utilizes the same bypass circuit for both electronic and mechanical chimes. In general, bypass circuits are required for regulating power to a mechanical chime due to the amount of power typically required to power a video doorbell. While the amount of power needed to power the video doorbell 202 is less (e.g., significantly less) than is needed to activate or ring a mechanical chime, the design of video doorbell power supplies causes large current spikes that must travel through the mechanical chime solenoid coil. These current spikes cause mechanical chimes to emit an annoying humming sound when they are integrated with a video doorbell 202 in an example video doorbell, or property monitoring, system.

As video doorbells use more and more power the humming noise will be louder and the current generation of bypass circuits may be too restrictive to allow enough power to flow to these newer video doorbell, even while in bypass mode. Electronic chimes and humming mechanical chimes may not be the only installation challenges faced when installing a video doorbell to a wide range of customers or property locations.

To address these challenges, this specification describes techniques for implementing an improved internal power supply design and hardware circuitry of a video doorbell. For example, systems and methods are disclosed to prevent or reduce the hum of the chime that can occur with the previously explained chime bypass, even under higher power conditions, as well as a way for a video doorbell to ring the chime without requiring a local power source such as a battery. In some implementations, the disclosed power supply design can be installed as a replacement to an existing power supply in a video doorbell to reduce or eliminate the humming sound emitted by components of a mechanical chime, which is often annoying to users or customers.

Figure 4:
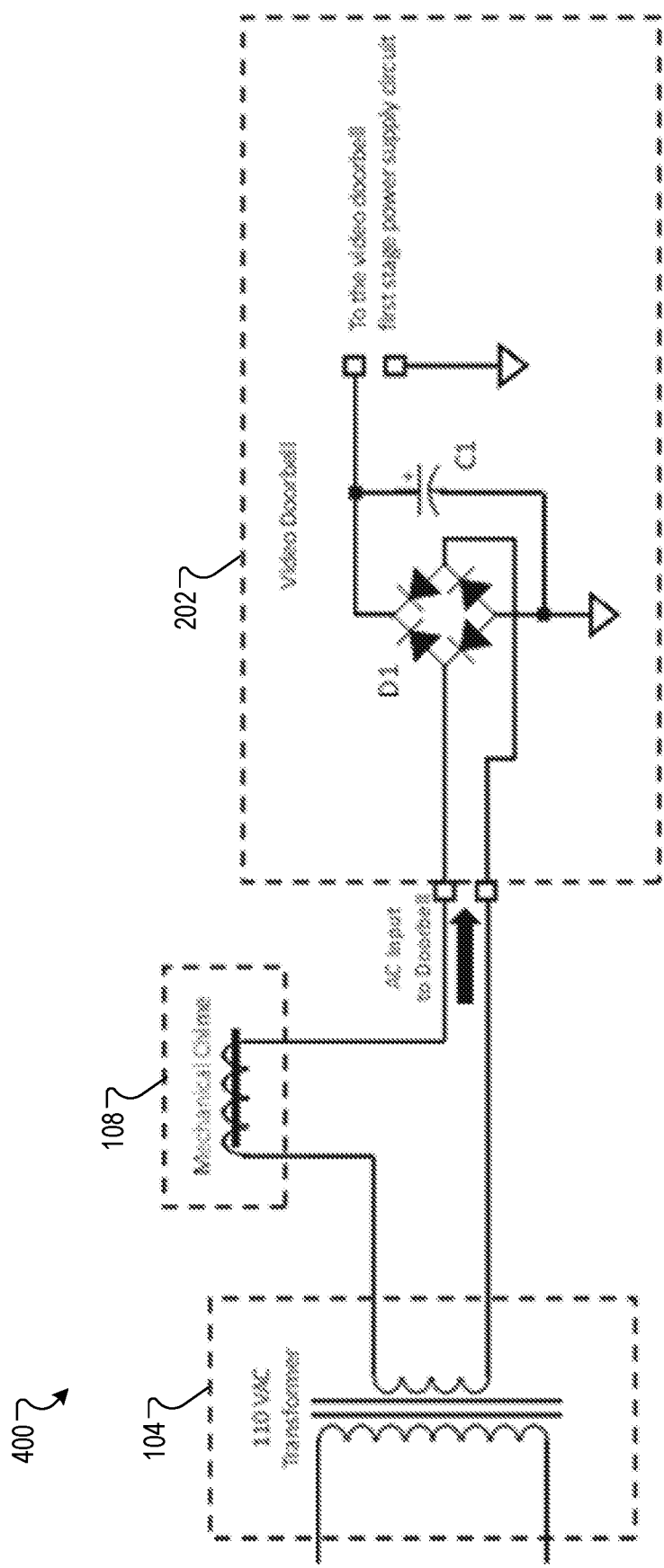
FIG. 4 illustrates an example circuit schematic of a video doorbell, mechanical chime, and transformer.

FIG. 4 illustrates an example circuit schematic 400 that includes circuit elements of the video doorbell 202, transformer 104, and mechanical chime 208. Circuit 400 also includes a diode bridge D1 and a capacitor C1 that are inputs to a first stage of a power supply in a typical video doorbell. Examples values for capacitor C1 can be 47 μF to 330 μF, however other values may be used based on design preference. The reason a video doorbell 202 causes a chime 208 to hum, even though the doorbell may use as little as 10% of the available power, will now be described with reference to the circuit of FIG. 4.

The transformer 104 shown in FIG. 4 (and FIG. 2) can convert 110 volts AC to 16 volts RMS. In general, the functionality of transformer 104 differs from that of a regulated power supply. When the transformer 104 is operating at full power the voltage is about 20 volts peak (upper half of the AC waveform) or, in root-mean-square (RMS) terms, 16 volts RMS. Since it is a transformer (e.g., an unregulated power source) and doorbells of the present disclosure draw less than the total power available, the typical voltage is approximately 30 volts peak or approximately 21 volts RMS. The transformer 104 and chime 208 may be external elements of the circuit in FIG. 4, whereas the circuit elements of the video doorbell 202 are inside the video doorbell.

The problem that causes the mechanical chime to hum is that the applied AC input power can only flow current to the onboard power supply when the applied AC voltage is higher than the voltage stored in C1. The capacitor voltage on C1 stays at or near the peak applied AC voltage for a significant portion of the time. This creates a very short time that it is able to charge C1. This charging current needs to supply the amount of power consumed by video doorbell. Since there is little time to generate this charge current, a high peak current is created to equal the average current required. This is based on the standard power expression of Power=Voltage*Current.

Figure 5:
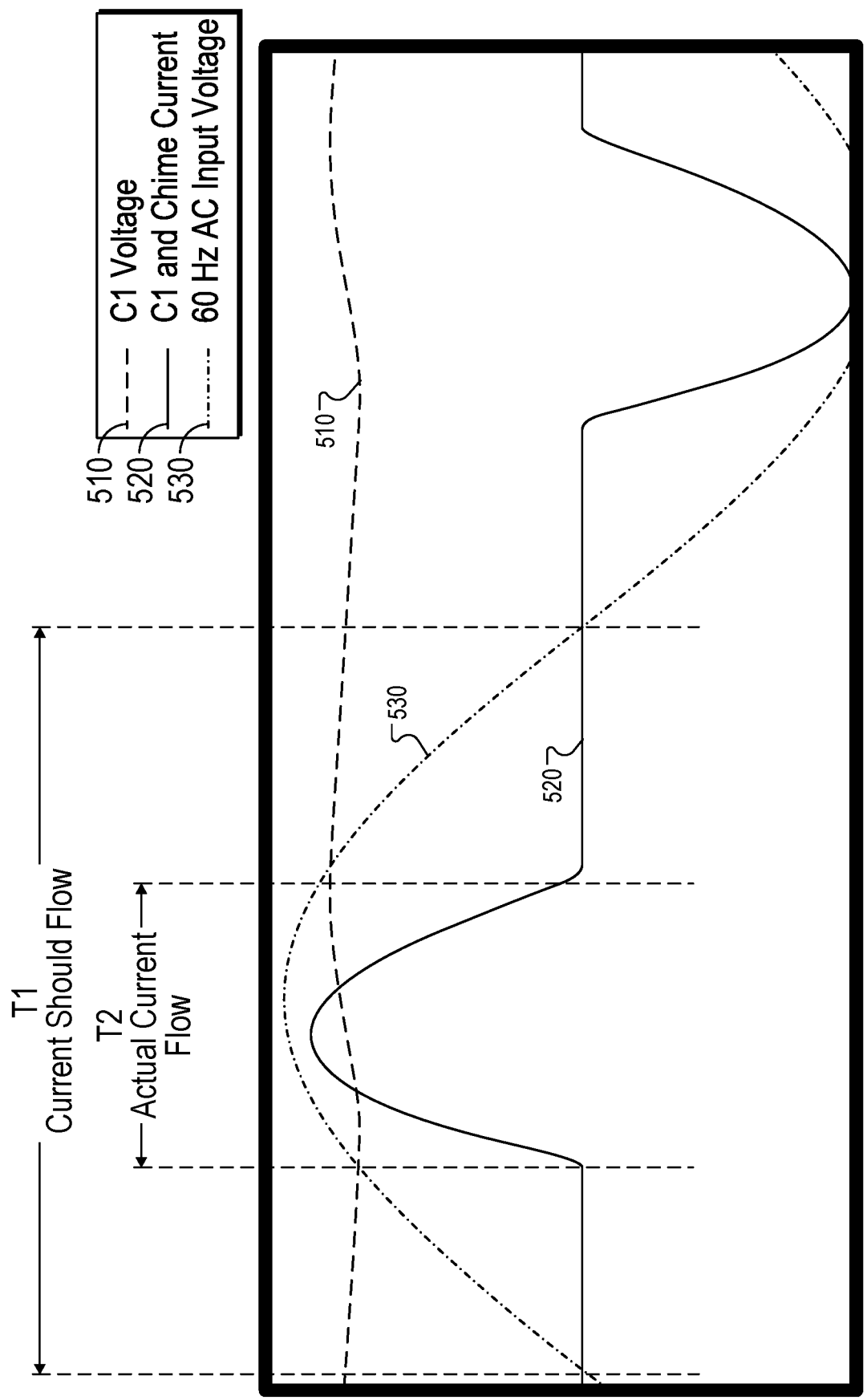
FIG. 5 illustrates voltage and current readings from the circuit of FIG. 4

FIG. 5 illustrates voltage and current readings from the circuit of FIG. 4. As shown in FIG. 5, trace 530 is the transformer AC output voltage as applied to the input of the video doorbell (see FIG. 4), trace 510 is the voltage across C1, and trace 520 is the current entering C1 which is the same as the current flowing through the mechanical chime. Illustrated in FIG. 5 is one half an AC cycle T1, the current (trace 520) is only flowing for time T2 and zero the rest of the time when it could flow for the full cycle T1. T2 is the time that the input AC voltage is higher than the voltage on C1.

Modern power supplies like the ones that are plugged directly into the 110 Volt AC wall socket for laptops or other devices do not use this structure. These modern switching power supplies don't have this problem of narrow peak currents. This is part of what is called power factor correction. These modern switching power supplies use the input AC current the entire AC input cycle time. Consumers and service providers may use an existing doorbell transformer during installation of a new video doorbell to save time. This would typically require installation of a bypass on the mechanical chime to eliminate the annoying humming sound, as described above. Use of an improved internal power supply design of a video doorbell as described in this document provides a method for eliminating the need to install a chime bypass.

Figure 6:
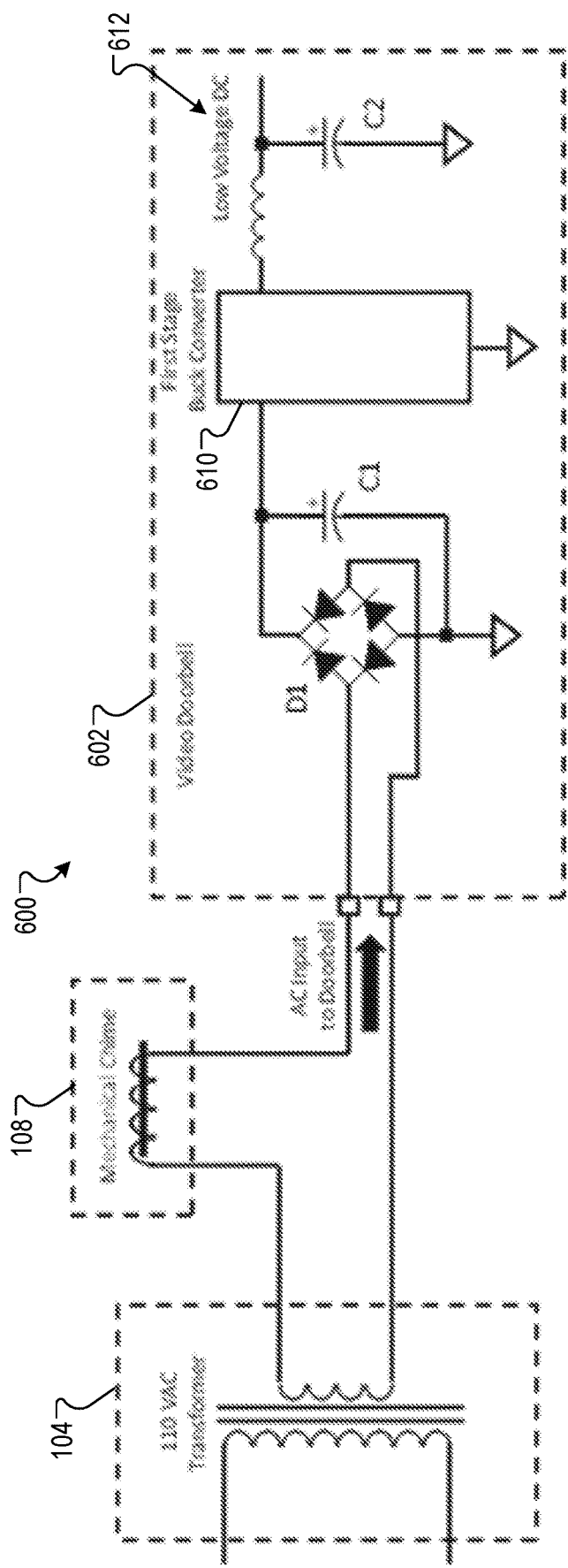
FIG. 6 illustrates an example video doorbell power supply design.

FIG. 6 illustrates an example video doorbell power supply design 600. The AC input voltage is first turned into DC by D1 and C1. More specifically, the diode bridge D1 receives a first voltage signal generated by transformer 104 and generates a second voltage signal based on the first voltage signal. The first voltage signal is the AC input voltage and the second voltage signal can be a DC voltage signal converted from the AC input voltage using the diode bridge D1. This AC input voltage is based upon the output voltage of the transformer 104 and is typically around 20 volts RMS and depending on the power consumed by the video doorbell typically becomes approximately 20-24 volts DC when applied to the first stage buck converter. The first stage buck converter outputs a lower voltage DC signal 712, typically under 6 volts so that the downstream buck power supplies can create the many lower DC voltages (e.g., power signal) required for providing power to the internal components of the video doorbell 202.

Figure 7:
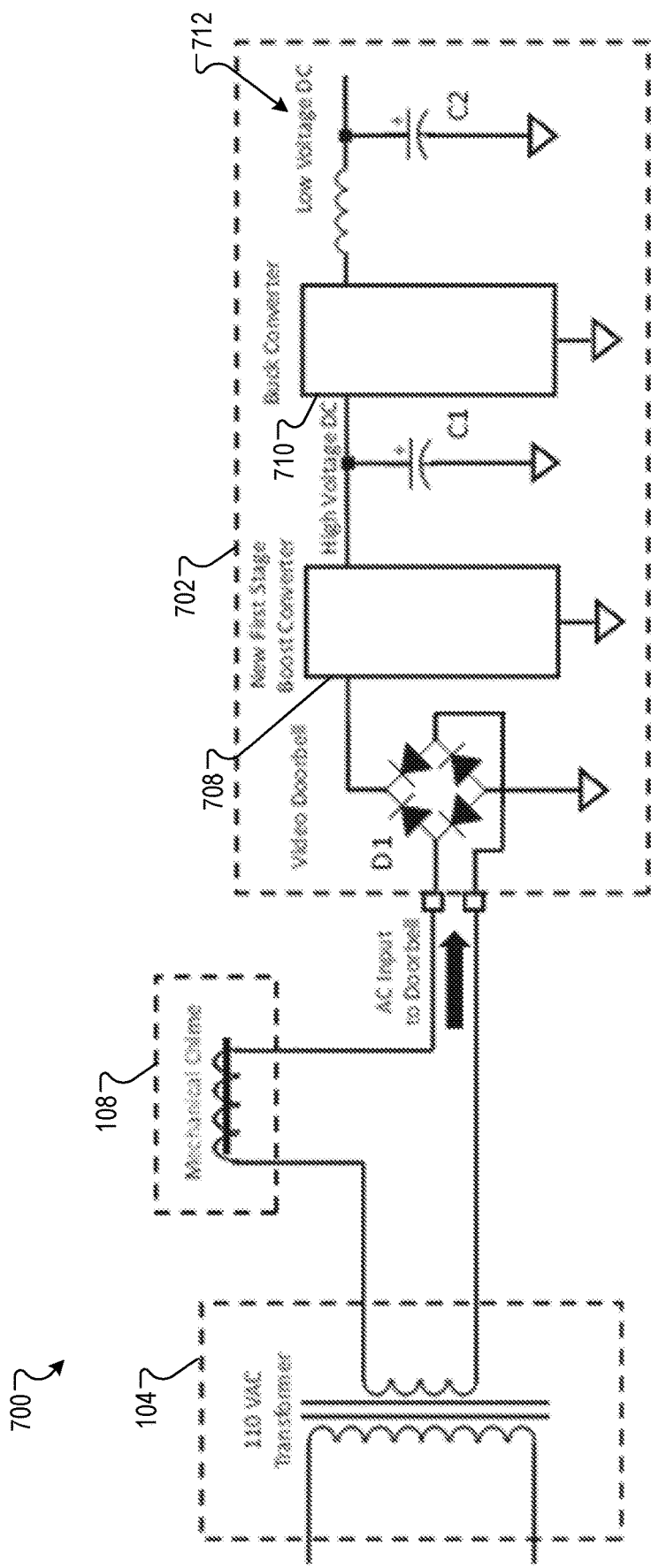
FIG. 7 illustrates an example video doorbell that includes a boost conversion stage in between the input diode bridge and the existing buck converter power conversion stage.

FIG. 7 illustrates an example circuit schematic 700 that shows circuit elements of the video doorbell that includes a boost conversion stage 708 intermediate the input diode bridge (D1) and the buck converter 710 of a power conversion stage that generates the low-voltage DC signal described above. The design disclosed in the example of FIG. 7 provides a new high-voltage DC signal that allows C1 to be continuously charged for the full input voltage cycle T1, which extends the charge time of this charging capacitor thereby lowering the input peak current. This is illustrated by comparing FIG. 5 with FIG. 8.

To generate the high-voltage DC signal, the boost circuit can be used to output a voltage that is 2 to 20 volts higher than the signal that would otherwise be at that high-voltage node without the boost converter/circuit 708. In some implementations, transformer 104 can be an 8 VAC, 16 VAC, or 24 VAC transformer. For example, with a 16 VAC 10 VA transformer, the circuit 700 would typically generate about 24 VDC on C1, which is the input of the buck converter 710. In this instance, the boost converter 708 can be set to generate a high-voltage signal of about 26 to 44 VDC. In some implementations, the signal boosting can be set dynamically based on software controls that read and process the input voltage to the boost converter. The signal boosting can be also set by disabling the boost converter and measuring the voltage on C1 to determine a setting for the boost converter to generate the high-voltage signal.

Figure 8:
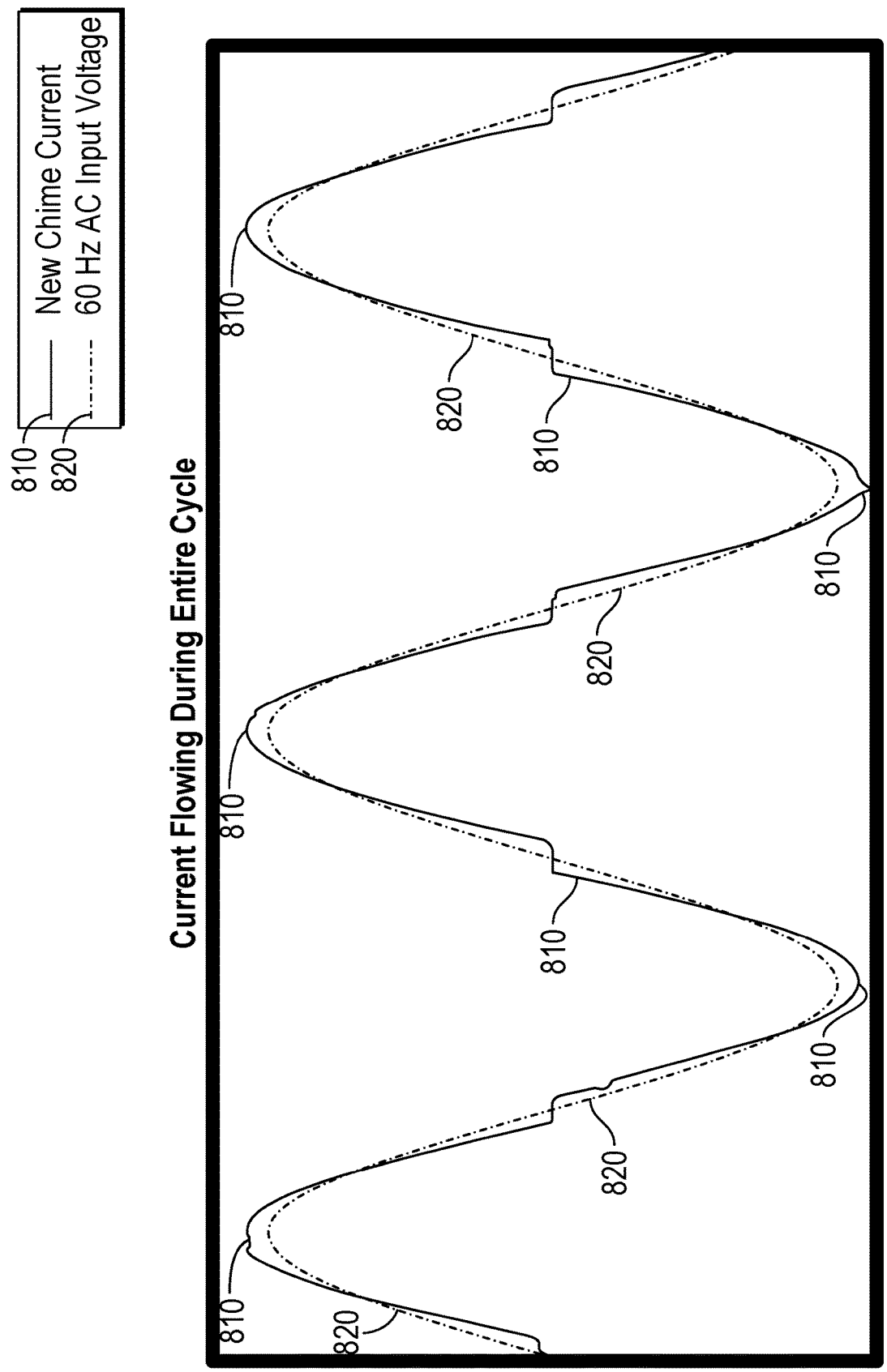
FIG. 8 illustrates voltage and current readings from the circuit of FIG. 7.

FIG. 8 illustrates voltage and current readings from the circuit of FIG. 7. Instead of current flowing only when the input voltage is higher than the capacitor C1 as shown in the example of FIG. 5, the addition of the boost stage as shown in FIG. 8, allows the input current (trace 810) to flow for substantially the entire time that the applied AC voltage (trace 820) is above 0 volts. The AC output power supply disclosed in the example of FIG. 7 and FIG. 8 can be used to address one or more of the challenges described above. For example, as noted above, the power supply design of FIG. 8 provides a high-voltage DC signal that extends the charge time such that C1 can be charged without generating a peak current that results in the chime hum sound.

Figure 9:
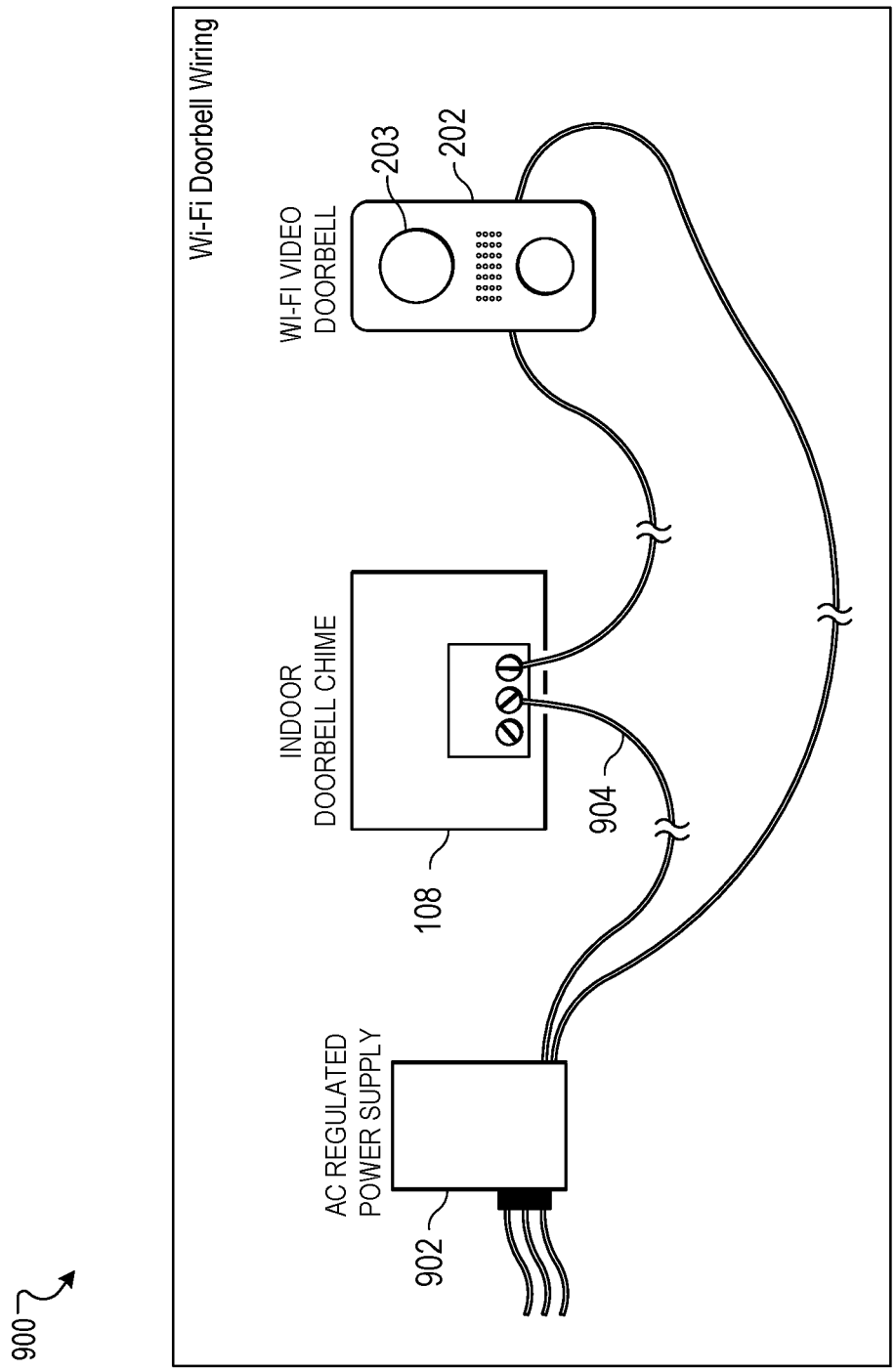
FIG. 9 illustrates the wiring of an example video doorbell.

FIG. 9 illustrates a wiring diagram 900 of an example video doorbell 202. In the example of FIG. 9, an AC regulated supply 902 ("AC regulator") provides output power to the chime 108 and doorbell 202. In some implementations, the AC regulator/supply 902 couples to an 110 VAC line at the property that includes the chime 108 and the video doorbell 202. For example, the AC supply 902 can be used as a replacement for the AC transformer 104 described earlier with reference to at least FIG. 6 and FIG. 7. In some other implementations, the AC supply 902 can be used in combination with, or in addition to, the AC transformer 104.

Referring again to the transformer 104, this transformer exits in a typical home and is often big and heavy, and over time either fails or the output voltage becomes too low due to the age of the protection circuit inside the transformer 104. A replacement transformer is expensive and also heavy, making shipping of the replacement expensive. In general, transformer 104 was designed to provide power for only a few seconds while a visitor presses the doorbell button 103. This few second duration that a visitor presses the button is a short time that does not often occur during a day. However, when a video doorbell 202 is installed at a property, the transformer 104 is required to provide power 24 hours a day, seven days a week, which leads to failure of a significant number of these transformers.

Referring again to FIG. 9, an example AC regulator 902 incorporates hardware circuitry that includes a unique implementation of switching power supply technology for receiving a first AC power signal (e.g., 110 VAC) and outputting a second, converted AC power signal 904 based on the first AC power signal. For example, the AC regulator 902 can function as a power converter that generates a stepped down version of the received first AC input signal. In some alternative implementations, the AC regulator 902 can be designed to generate a direct-current (DC) power signal based on the first AC power signal. For example, the AC regulator 902 can function as an extension of a first stage power supply circuit of the video doorbell 202 that converts 110 VAC into a low-voltage DC output that can range from 5 volts (USB type) up to 19 volts for a laptop.

In some implementations, the AC supply 902 of the present disclosure is an AC-to-DC power supply whose internal DC signal is converted back into an AC squarewave signal and used to power the video doorbell system. There are various methods for creating an AC voltage signal from a DC voltage signal. One method involves using a set of transistors at the power supply output to direct the DC voltage and current to form an AC voltage and current. The transistors are turned on in such a fashion as to cause current to flow in one direction and then in the other direction. The example AC supply 902 can be light weight and inexpensive to manufacture and ship relative to conventional power supplies that do not provide comparable functionality.

Other than an AC transformer that supplies AC power, examples of an electronic switching supply that outputs AC power are uncommon. While some Wi-Fi video doorbells 202 can work with an AC or a DC power source, the video doorbell may not be compatible with indoor doorbell chimes. Over time use of DC power may also ruin the solenoid of a chime 108 that is designed for use with only AC power. A defective solenoid of an electronic chime 108 will not detect the signal to output the chime audio, and thus will not make a ringing sound if it is connected using a DC power source.

Figure 10:
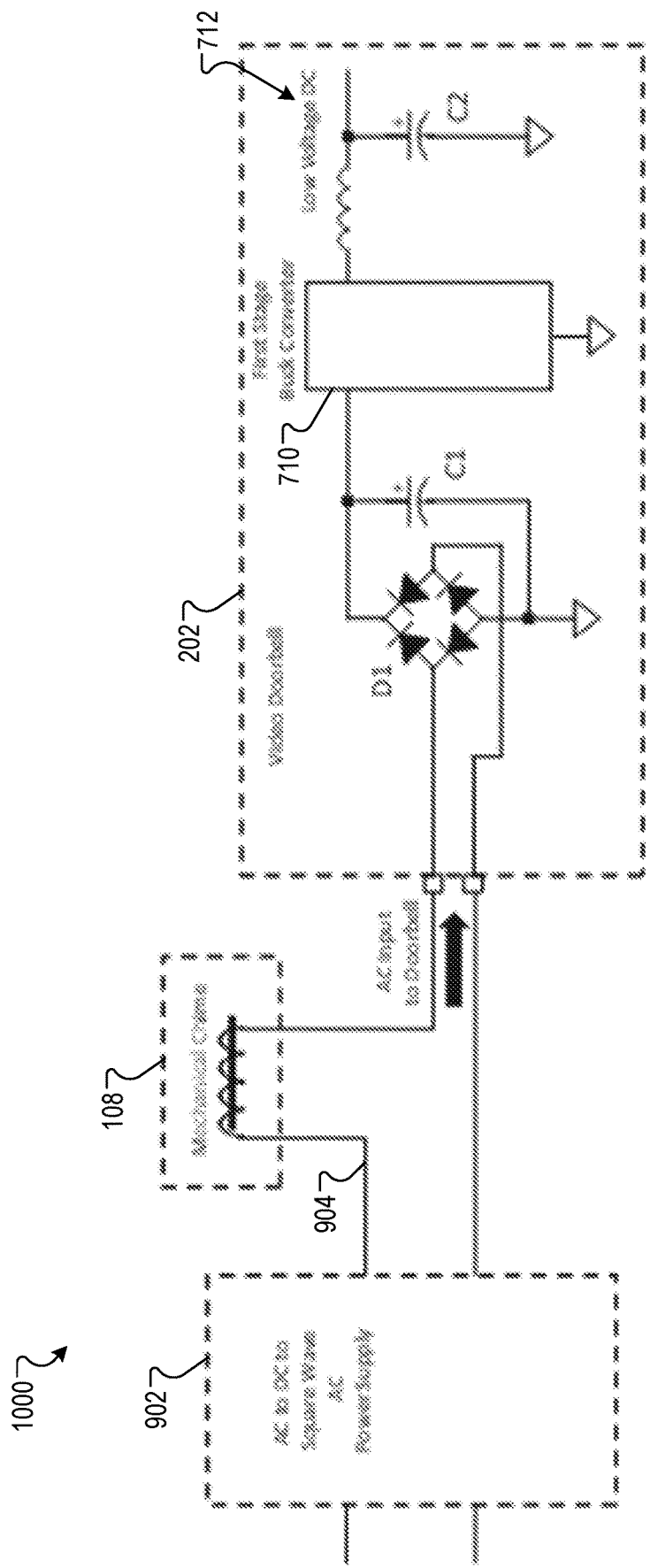
FIG. 10 illustrates an example power supply for the AC transformer that provides AC power to the mechanical chime and video doorbell.

FIG. 10 illustrates an example circuit schematic 1000 that includes circuit elements of the AC supply 902 for the AC transformer 104, the chime 108, and the video doorbell 202. The power supply 902 provides AC power to the mechanical (or electronic) chime 108 and video doorbell 202. A unique attribute of the AC supply 902 is, even with higher-powered video/Wi-Fi doorbells, this particular type of AC supply 902 creates a novel AC waveform shape and frequency that eliminates or reduces humming from the mechanical chime 108 without the need or requirement of a bypass circuit being coupled to the chime 108.

Chimes 108 generate an unwanted hum at a 120 Hertz rate. This means the chime 108 vibrates twice every 60 Hertz cycle from AC current directed in one direction, then in the same 60 Hz cycle, once in the opposite direction. The peak currents that cause the hum vibrate the chime at an easily audible rate of 120 Hz. A transformer 104 cannot create waveforms other than the same sinusoidal shape of the applied 110 VAC signal at 60 Hertz. As an improvement, the AC supply 902 is used to generate an AC power signal 904 having waveform characteristics, for example a 5 Hertz frequency, that do not trigger an audible hum at the chime 108. If an AC waveform is made to operate at a sub-audible rate such as 5 Hertz instead of 60 Hertz, use of this AC waveform will make the chime hum inaudible since people cannot hear 5 Hertz.

Figure 11:
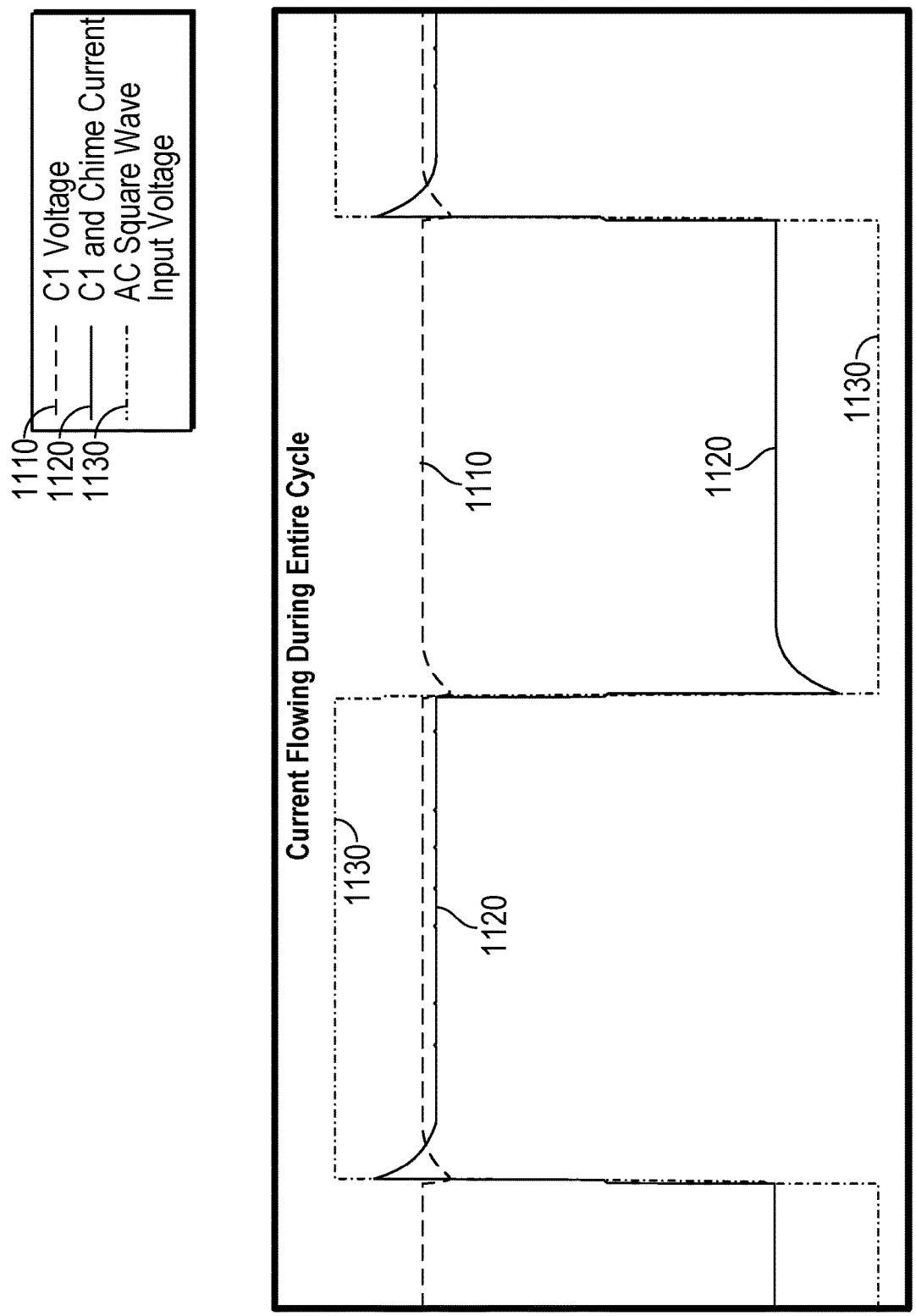
FIG. 11 illustrates voltage and current readings from the circuit of FIG. 10.

FIG. 11 illustrates voltage and current readings from the example circuit of FIG. 10. The readings in the example of FIG. 11 include the voltage 1110 on capacitor C1, the current 1120 at the capacitor C1 and the chime 108, and the AC square wave input voltage 1130. If the AC waveform is a square wave (as depicted in FIG. 11) instead of a sine wave, the long slow sine wave slope is replaced by a square wave that is its peak voltage for a substantial portion of the entire AC cycle rather than at or near its peak for a very small portion of a cycle. The significance of this was previously out, where the peak applied voltage must be higher than the input capacitor to charge it.

Figure 12:
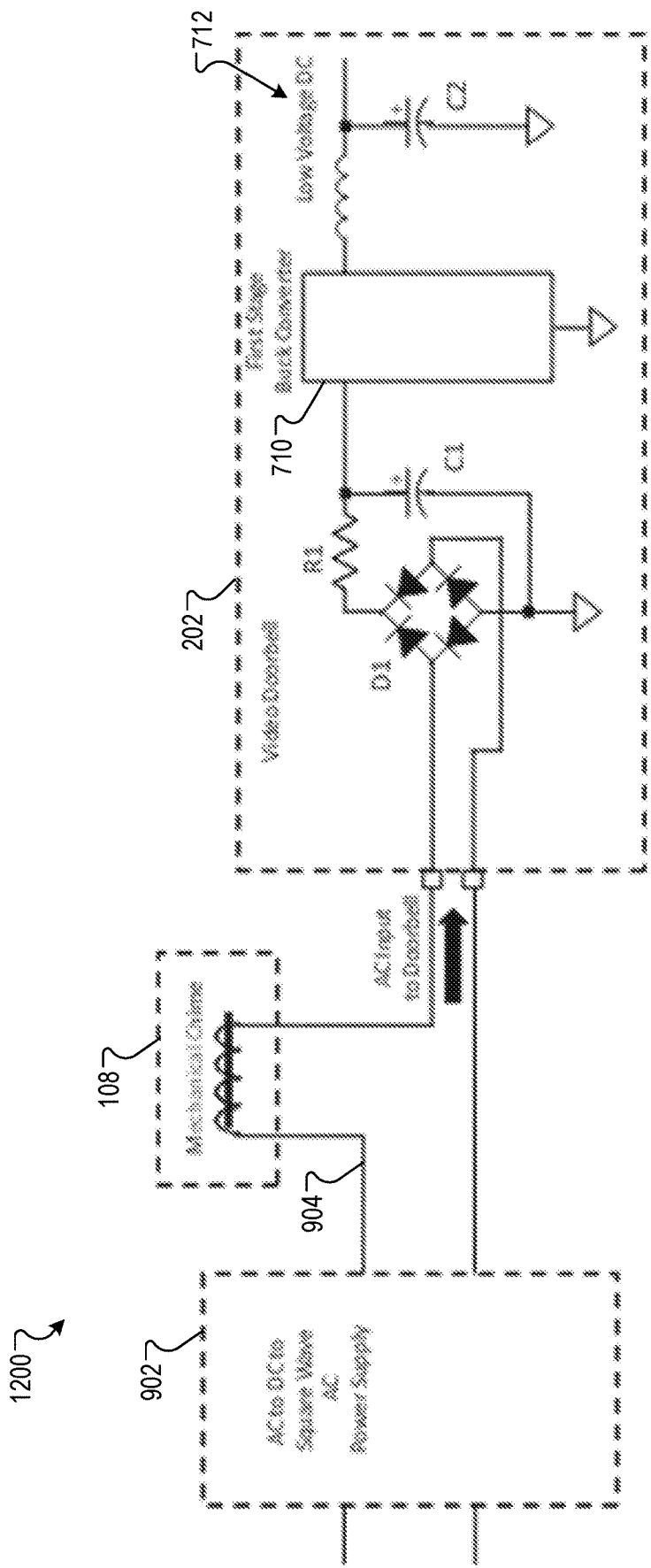
FIG. 12 is a schematic of an example video doorbell with the addition of a resistor to increase the charging time and to lower a peak current signal.
Figure 13:
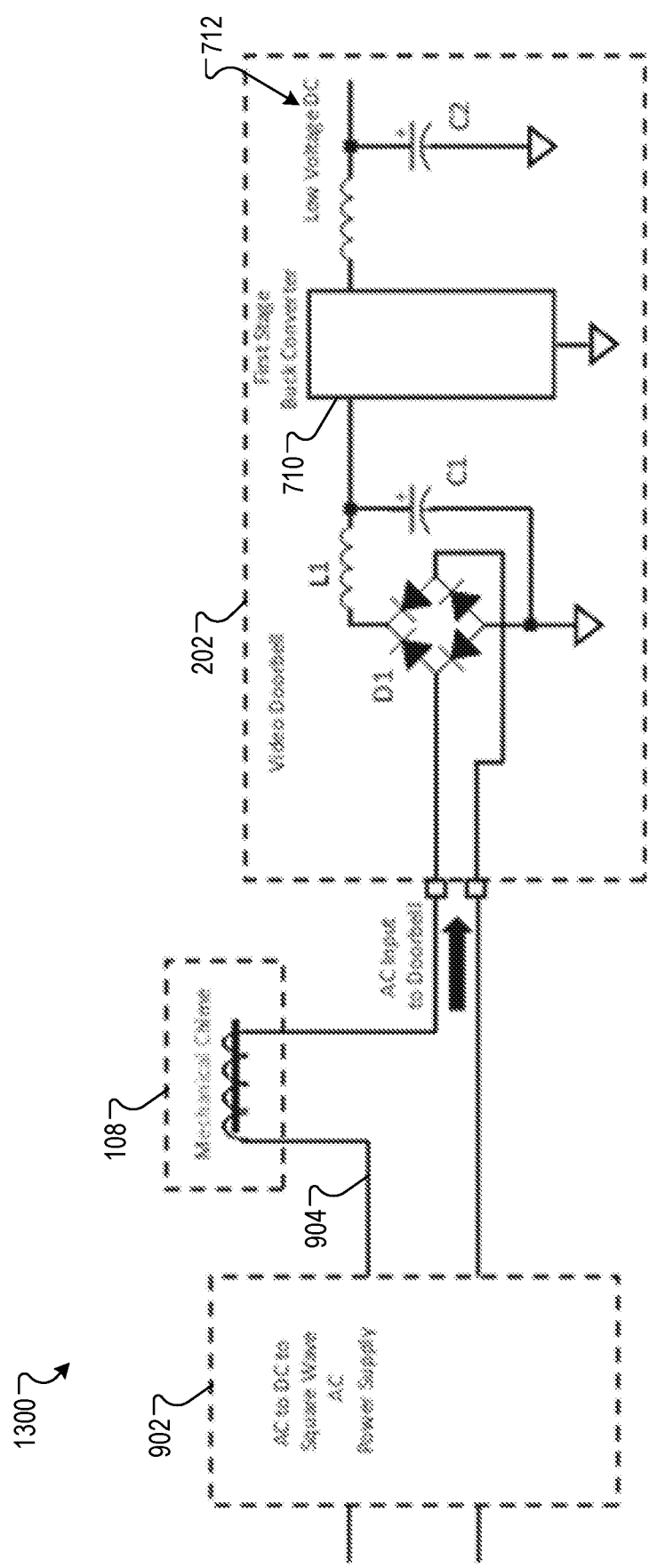
FIG. 13 is a schematic of an example video doorbell with the addition of an inductor to increase the charging time and lower a peak current signal.

FIG. 12 is an example circuit schematic 1200 that includes circuit elements of the AC supply 902 for the AC transformer 104, the chime 108, and the video doorbell 202 with the addition of a resistor R1 (e.g., a small value resistor of a few ohms to tens of ohms). The resistor R1 is used to increase the charging time of capacitor C1 and lower the peak current described above. FIG. 13 is an example circuit schematic 1300 that includes circuit elements of the AC supply 902, the chime 108, and the video doorbell 202 with the addition of an inductor L1 to provide an alternative method to increase the charging time of capacitor C1 and to lower the peak current described above.

Figure 14:
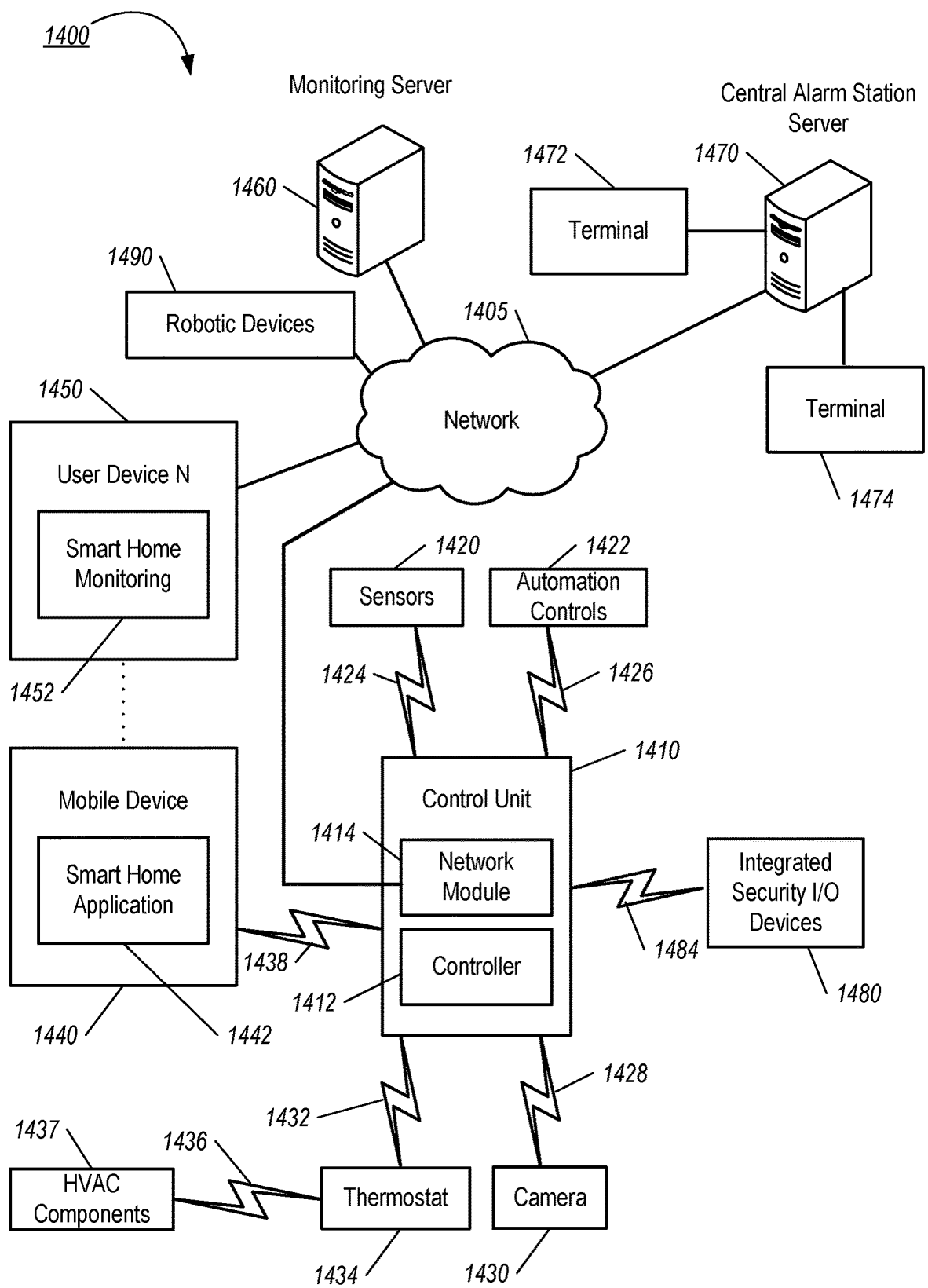
FIG. 14 is a block diagram illustrating an example security monitoring system.

FIG. 14 is a diagram illustrating an example of a home monitoring system 1400. The monitoring system 1400 includes a network 1405, a control unit 1410, one or more user devices 1440 and 1450, a monitoring server 1460, and a central alarm station server 1470. In some examples, the network 1405 facilitates communications between the control unit 1410, the one or more user devices 1440 and 1450, the monitoring server 1460, and the central alarm station server 1470.

The network 1405 is configured to enable exchange of electronic communications between devices connected to the network 1405. For example, the network 1405 may be configured to enable exchange of electronic communications between the control unit 1410, the one or more user devices 1440 and 1450, the monitoring server 1460, and the central alarm station server 1470. The network 1405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 1405 may include multiple networks or subnetworks, each of which may include, for example, a wired or wireless data pathway. The network 1405 may include a circuit-switched network, a packet-switched data network, or any other network able to carry electronic communications (e.g., data or voice communications). For example, the network 1405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 1405 may include one or more networks that include wireless data channels and wireless voice channels. The network 1405 may be a wireless network, a broadband network, or a combination of networks including a wireless network and a broadband network.

The control unit 1410 includes a controller 1412 and a network module 1414. The controller 1412 is configured to control a control unit monitoring system (e.g., a control unit system) that includes the control unit 1410. In some examples, the controller 1412 may include a processor or other control circuitry configured to execute instructions of a program that controls operation of a control unit system. In these examples, the controller 1412 may be configured to receive input from sensors, flow meters, or other devices included in the control unit system and control operations of devices included in the household (e.g., speakers, lights, doors, etc.). For example, the controller 1412 may be configured to control operation of the network module 1414 included in the control unit 1410.

The network module 1414 is a communication device configured to exchange communications over the network 1405. The network module 1414 may be a wireless communication module configured to exchange wireless communications over the network 1405. For example, the network module 1414 may be a wireless communication device configured to exchange communications over a wireless data channel and a wireless voice channel. In this example, the network module 1414 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, 5G CDMA, EDGE or EGPRS, EV-DO or EVDO, UMTS, or IP.

The network module 1414 also may be a wired communication module configured to exchange communications over the network 1405 using a wired connection. For instance, the network module 1414 may be a modem, a network interface card, or another type of network interface device. The network module 1414 may be an Ethernet network card configured to enable the control unit 1410 to communicate over a local area network and/or the Internet. The network module 1414 also may be a voice band modem configured to enable the alarm panel to communicate over the telephone lines of Plain Old Telephone Systems (POTS).

The control unit system that includes the control unit 1410 includes one or more sensors. For example, the monitoring system may include multiple sensors 1420. The sensors 1420 may include a lock sensor, a contact sensor, a motion sensor, or any other type of sensor included in a control unit system. The sensors 1420 also may include an environmental sensor, such as a temperature sensor, a water sensor, a rain sensor, a wind sensor, a light sensor, a smoke detector, a carbon monoxide detector, an air quality sensor, etc. The sensors 1420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 1420 can also include a radio-frequency identification (RFID) sensor that identifies a particular article that includes a pre-assigned RFID tag.

The control unit 1410 communicates with the home automation controls 1422 and a camera 1430 to perform monitoring. The home automation controls 1422 are connected to one or more devices that enable automation of actions in the home. For instance, the home automation controls 1422 may be connected to one or more lighting systems and may be configured to control operation of the one or more lighting systems. In addition, the home automation controls 1422 may be connected to one or more electronic locks at the home and may be configured to control operation of the one or more electronic locks (e.g., control Z-Wave locks using wireless communications in the Z-Wave protocol). Further, the home automation controls 1422 may be connected to one or more appliances at the home and may be configured to control operation of the one or more appliances. The home automation controls 1422 may include multiple modules that are each specific to the type of device being controlled in an automated manner. The home automation controls 1422 may control the one or more devices based on commands received from the control unit 1410. For instance, the home automation controls 1422 may cause a lighting system to illuminate an area to provide a better image of the area when captured by a camera 1430.

The camera 1430 may be a video/photographic camera or other type of optical sensing device configured to capture images. For instance, the camera 1430 may be configured to capture images of an area within a building or home monitored by the control unit 1410. The camera 1430 may be configured to capture single, static images of the area and also video images of the area in which multiple images of the area are captured at a relatively high frequency (e.g., thirty images per second). The camera 1430 may be controlled based on commands received from the control unit 1410.

The camera 1430 may be triggered by several different types of techniques. For instance, a Passive Infra-Red (PIR) motion sensor may be built into the camera 1430 and used to trigger the camera 1430 to capture one or more images when motion is detected. The camera 1430 also may include a microwave motion sensor built into the camera and used to trigger the camera 1430 to capture one or more images when motion is detected. The camera 1430 may have a "normally open" or "normally closed" digital input that can trigger capture of one or more images when external sensors (e.g., the sensors 1420, PIR, door/window, etc.) detect motion or other events. In some implementations, the camera 1430 receives a command to capture an image when external devices detect motion or another potential alarm event. The camera 1430 may receive the command from the controller 1412 or directly from one of the sensors 1420.

In some examples, the camera 1430 triggers integrated or external illuminators (e.g., Infra-Red, Z-wave controlled "white" lights, lights controlled by the home automation controls 1422, etc.) to improve image quality when the scene is dark. An integrated or separate light sensor may be used to determine if illumination is desired and may result in increased image quality.

The camera 1430 may be programmed with any combination of time/day schedules, system "arming state", or other variables to determine whether images should be captured or not when triggers occur. The camera 1430 may enter a low-power mode when not capturing images. In this case, the camera 1430 may wake periodically to check for inbound messages from the controller 1412. The camera 1430 may be powered by internal, replaceable batteries if located remotely from the control unit 1410. The camera 1430 may employ a small solar cell to recharge the battery when light is available. Alternatively, the camera 1430 may be powered by the controller's 1412 power supply if the camera 1430 is co-located with the controller 1412.

In some implementations, the camera 1430 communicates directly with the monitoring server 1460 over the Internet. In these implementations, image data captured by the camera 1430 does not pass through the control unit 1410 and the camera 1430 receives commands related to operation from the monitoring server 1460.

The system 1400 may also include a thermostat 1434 to perform dynamic environmental control at the home. The thermostat 1434 is configured to monitor temperature and/or energy consumption of an HVAC system associated with the thermostat 1434, and is further configured to provide control of environmental (e.g., temperature) settings. In some implementations, the thermostat 1434 can additionally or alternatively receive data relating to activity at a home and/or environmental data at a home, e.g., at various locations indoors and outdoors at the home. The thermostat 1434 can directly measure energy consumption of the HVAC system associated with the thermostat, or can estimate energy consumption of the HVAC system associated with the thermostat 1434, for example, based on detected usage of one or more components of the HVAC system associated with the thermostat 1434. The thermostat 1434 can communicate temperature and/or energy monitoring information to or from the control unit 1410 and can control the environmental (e.g., temperature) settings based on commands received from the control unit 1410.

In some implementations, the thermostat 1434 is a dynamically programmable thermostat and can be integrated with the control unit 1410. For example, the dynamically programmable thermostat 1434 can include the control unit 1410, e.g., as an internal component to the dynamically programmable thermostat 1434. In addition, the control unit 1410 can be a gateway device that communicates with the dynamically programmable thermostat 1434. In some implementations, the thermostat 1434 is controlled via one or more home automation controls 1422.

A module 1437 is connected to one or more components of an HVAC system associated with a home, and is configured to control operation of the one or more components of the HVAC system. In some implementations, the module 1437 is also configured to monitor energy consumption of the HVAC system components, for example, by directly measuring the energy consumption of the HVAC system components or by estimating the energy usage of the one or more HVAC system components based on detecting usage of components of the HVAC system. The module 1437 can communicate energy monitoring information and the state of the HVAC system components to the thermostat 1434 and can control the one or more components of the HVAC system based on commands received from the thermostat 1434.

In some examples, the system 1400 further includes one or more robotic devices 1490. The robotic devices 1490 may be any type of robots that are capable of moving and taking actions that assist in home monitoring. For example, the robotic devices 1490 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 1490 may be devices that are intended for other purposes and merely associated with the system 1400 for use in appropriate circumstances. For instance, a robotic vacuum cleaner device may be associated with the monitoring system 1400 as one of the robotic devices 1490 and may be controlled to take action responsive to monitoring system events.

In some examples, the robotic devices 1490 automatically navigate within a home or outside a home. In these examples, the robotic devices 1490 include sensors and control processors that guide movement of the robotic devices 1490 within the home or outside the home. For instance, the robotic devices 1490 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 1490 may include control processors that process output from the various sensors and control the robotic devices 1490 to move along a path that reaches the desired destination and avoids obstacles. In this regard, the control processors detect walls or other obstacles in the home or outside the home and guide movement of the robotic devices 1490 in a manner that avoids the walls, trees, fences, and other obstacles.

In addition, the robotic devices 1490 may store data that describes attributes of the home and the area outside the home. For instance, the robotic devices 1490 may store a floorplan, a property map, and/or a three-dimensional model of the home that enables the robotic devices 1490 to navigate the home. During initial configuration, the robotic devices 1490 may receive the data describing attributes of the home, determine a frame of reference to the data (e.g., a home or reference location in the home), and navigate the home based on the frame of reference and the data describing attributes of the home. Further, initial configuration of the robotic devices 1490 also may include learning of one or more navigation patterns in which a user provides input to control the robotic devices 1490 to perform a specific navigation action (e.g., fly to an upstairs bedroom and spin around while capturing video and then return to a home charging base). In this regard, the robotic devices 1490 may learn and store the navigation patterns such that the robotic devices 1490 may automatically repeat the specific navigation actions upon a later request.

In some examples, the robotic devices 1490 may include data capture and recording devices. In these examples, the robotic devices 1490 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 1490 to take and store a biometric sample that can be used to identify the person (e.g., a biometric sample with DNA that can be used for DNA testing).

In some implementations, the robotic devices 1490 may include output devices. In these implementations, the robotic devices 1490 may include one or more displays, one or more speakers, and/or any type of output devices that allow the robotic devices 1490 to communicate information to a nearby user.

The robotic devices 1490 also may include a communication module that enables the robotic devices 1490 to communicate with the control unit 1410, each other, and/or other devices. The communication module may be a wireless communication module that allows the robotic devices 1490 to communicate wirelessly. For instance, the communication module may be a Wi-Fi module that enables the robotic devices 1490 to communicate over a local wireless network at the home. The communication module further may be a 900 MHz wireless communication module that enables the robotic devices 1490 to communicate directly with the control unit 1410. Other types of short-range wireless communication protocols, such as Bluetooth, Bluetooth LE, Z-wave, Zigbee, etc., may be used to allow the robotic devices 1490 to communicate with other devices in the home. In some implementations, the robotic devices 1490 may communicate with each other or with other devices of the system 1400 through the network 1405.

The robotic devices 1490 further may include processor and storage capabilities. The robotic devices 1490 may include any suitable processing devices that enable the robotic devices 1490 to operate applications and perform the actions described throughout this disclosure. In addition, the robotic devices 1490 may include solid-state electronic storage that enables the robotic devices 1490 to store applications, configuration data, collected sensor data, and/or any other type of information available to the robotic devices 1490.

The robotic devices 1490 are associated with one or more charging stations. The charging stations may be located at predefined home base or reference locations in the home. The robotic devices 1490 may be configured to navigate to the charging stations after completion of tasks needed to be performed for the monitoring system 1400. For instance, after completion of a monitoring operation or upon instruction by the control unit 1410, the robotic devices 1490 may be configured to automatically fly to and land on one of the charging stations. In this regard, the robotic devices 1490 may automatically maintain a fully charged battery in a state in which the robotic devices 1490 are ready for use by the monitoring system 1400.

The charging stations may be contact based charging stations and/or wireless charging stations. For contact based charging stations, the robotic devices 1490 may have readily accessible points of contact that the robotic devices 1490 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 1490 may charge through a wireless exchange of power. In these cases, the robotic devices 1490 need only locate themselves closely enough to the wireless charging stations for the wireless exchange of power to occur. In this regard, the positioning needed to land at a predefined home base or reference location in the home may be less precise than with a contact based charging station. Based on the robotic devices 1490 landing at a wireless charging station, the wireless charging station outputs a wireless signal that the robotic devices 1490 receive and convert to a power signal that charges a battery maintained on the robotic devices 1490.

In some implementations, each of the robotic devices 1490 has a corresponding and assigned charging station such that the number of robotic devices 1490 equals the number of charging stations. In these implementations, the robotic devices 1490 always navigate to the specific charging station assigned to that robotic device. For instance, a first robotic device may always use a first charging station and a second robotic device may always use a second charging station.

In some examples, the robotic devices 1490 may share charging stations. For instance, the robotic devices 1490 may use one or more community charging stations that are capable of charging multiple robotic devices 1490. The community charging station may be configured to charge multiple robotic devices 1490 in parallel. The community charging station may be configured to charge multiple robotic devices 1490 in serial such that the multiple robotic devices 1490 take turns charging and, when fully charged, return to a predefined home base or reference location in the home that is not associated with a charger. The number of community charging stations may be less than the number of robotic devices 1490.

In addition, the charging stations may not be assigned to specific robotic devices 1490 and may be capable of charging any of the robotic devices 1490. In this regard, the robotic devices 1490 may use any suitable, unoccupied charging station when not in use. For instance, when one of the robotic devices 1490 has completed an operation or is in need of battery charge, the control unit 1410 references a stored table of the occupancy status of each charging station and instructs the robotic device to navigate to the nearest charging station that is unoccupied.

The system 1400 further includes one or more integrated security devices 1480. The one or more integrated security devices may include any type of device used to provide alerts based on received sensor data. For instance, the one or more control units 1410 may provide one or more alerts to the one or more integrated security input/output devices 1480. Additionally, the one or more control units 1410 may receive one or more sensor data from the sensors 1420 and determine whether to provide an alert to the one or more integrated security input/output devices 1480.

The sensors 1420, the home automation controls 1422, the camera 1430, the thermostat 1434, and the integrated security devices 1480 may communicate with the controller 1412 over communication links 1424, 1426, 1428, 1432, 1438, and 1484. The communication links 1424, 1426, 1428, 1432, 1438, and 1484 may be a wired or wireless data pathway configured to transmit signals from the sensors 1420, the home automation controls 1422, the camera 1430, the thermostat 1434, and the integrated security devices 1480 to the controller 1412. The sensors 1420, the home automation controls 1422, the camera 1430, the thermostat 1434, and the integrated security devices 1480 may continuously transmit sensed values to the controller 1412, periodically transmit sensed values to the controller 1412, or transmit sensed values to the controller 1412 in response to a change in a sensed value.

The communication links 1424, 1426, 1428, 1432, 1438, and 1484 may include a local network. The sensors 1420, the home automation controls 1422, the camera 1430, the thermostat 1434, and the integrated security devices 1480, and the controller 1412 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 14 (CAT5) or Category 6 (CAT6) wired Ethernet network. The local network may be a mesh network constructed based on the devices connected to the mesh network.

The monitoring server 1460 is an electronic device configured to provide monitoring services by exchanging electronic communications with the control unit 1410, the one or more user devices 1440 and 1450, and the central alarm station server 1470 over the network 1405. For example, the monitoring server 1460 may be configured to monitor events generated by the control unit 1410. In this example, the monitoring server 1460 may exchange electronic communications with the network module 1414 included in the control unit 1410 to receive information regarding events detected by the control unit 1410. The monitoring server 1460 also may receive information regarding events from the one or more user devices 1440 and 1450.

In some examples, the monitoring server 1460 may route alert data received from the network module 1414 or the one or more user devices 1440 and 1450 to the central alarm station server 1470. For example, the monitoring server 1460 may transmit the alert data to the central alarm station server 1470 over the network 1405.

The monitoring server 1460 may store sensor and image data received from the monitoring system and perform analysis of sensor and image data received from the monitoring system. Based on the analysis, the monitoring server 1460 may communicate with and control aspects of the control unit 1410 or the one or more user devices 1440 and 1450.

The monitoring server 1460 may provide various monitoring services to the system 1400. For example, the monitoring server 1460 may analyze the sensor, image, and other data to determine an activity pattern of a resident of the home monitored by the system 1400. In some implementations, the monitoring server 1460 may analyze the data for alarm conditions or may determine and perform actions at the home by issuing commands to one or more of the controls 1422, possibly through the control unit 1410.

The monitoring server 1460 can be configured to provide information (e.g., activity patterns) related to one or more residents of the home monitored by the system 1400 (e.g., an example user). For example, one or more of the sensors 1420, the home automation controls 1422, the camera 1430, the thermostat 1434, and the integrated security devices 1480 can collect data related to a resident including location information (e.g., if the resident is home or is not home) and provide location information to the thermostat 1434.

The central alarm station server 1470 is an electronic device configured to provide alarm monitoring service by exchanging communications with the control unit 1410, the one or more user devices 1440 and 1450, and the monitoring server 1460 over the network 1405. For example, the central alarm station server 1470 may be configured to monitor alerting events generated by the control unit 1410. In this example, the central alarm station server 1470 may exchange communications with the network module 1414 included in the control unit 1410 to receive information regarding alerting events detected by the control unit 1410. The central alarm station server 1470 also may receive information regarding alerting events from the one or more user devices 1440 and 1450 and/or the monitoring server 1460.

The central alarm station server 1470 is connected to multiple terminals 1472 and 1474. The terminals 1472 and 1474 may be used by operators to process alerting events. For example, the central alarm station server 1470 may route alerting data to the terminals 1472 and 1474 to enable an operator to process the alerting data. The terminals 1472 and 1474 may include general-purpose computers (e.g., desktop personal computers, workstations, or laptop computers) that are configured to receive alerting data from a server in the central alarm station server 1470 and render a display of information based on the alerting data. For instance, the controller 1412 may control the network module 1414 to transmit, to the central alarm station server 1470, alerting data indicating that a sensor 1420 detected motion from a motion sensor via the sensors 1420. The central alarm station server 1470 may receive the alerting data and route the alerting data to the terminal 1472 for processing by an operator associated with the terminal 1472. The terminal 1472 may render a display to the operator that includes information associated with the alerting event (e.g., the lock sensor data, the motion sensor data, the contact sensor data, etc.) and the operator may handle the alerting event based on the displayed information.

In some implementations, the terminals 1472 and 1474 may be mobile devices or devices designed for a specific function. Although FIG. 14 illustrates two terminals for brevity, actual implementations may include more (and, perhaps, many more) terminals.

The one or more authorized user devices 1440 and 1450 are devices that host and display user interfaces. For instance, the user device 1440 is a mobile device that hosts or runs one or more native applications (e.g., the home monitoring application 1442). The user device 1440 may be a cellular phone or a non-cellular locally networked device with a display. The user device 1440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 1440 may perform functions unrelated to the monitoring system, such as placing personal telephone calls, playing music, playing video, displaying pictures, browsing the Internet, maintaining an electronic calendar, etc.

The user device 1440 includes a home monitoring application 1452. The home monitoring application 1442 refers to a software/firmware program running on the corresponding mobile device that enables the user interface and features described throughout. The user device 1440 may load or install the home monitoring application 1442 based on data received over a network or data received from local media. The home monitoring application 1442 runs on mobile devices platforms, such as iPhone, iPod touch, Blackberry, Google Android, Windows Mobile, etc. The home monitoring application 1442 enables the user device 1440 to receive and process image and sensor data from the monitoring system.

The user device 1440 may be a general-purpose computer (e.g., a desktop personal computer, a workstation, or a laptop computer) that is configured to communicate with the monitoring server 1460 and/or the control unit 1410 over the network 1405. The user device 1440 may be configured to display a smart home user interface 1452 that is generated by the user device 1440 or generated by the monitoring server 1460. For example, the user device 1440 may be configured to display a user interface (e.g., a web page) provided by the monitoring server 1460 that enables a user to perceive images captured by the camera 1430 and/or reports related to the monitoring system. Although FIG. 14 illustrates two user devices for brevity, actual implementations may include more (and, perhaps, many more) or fewer user devices.

In some implementations, the one or more user devices 1440 and 1450 communicate with and receive monitoring system data from the control unit 1410 using the communication link 1438. For instance, the one or more user devices 1440 and 1450 may communicate with the control unit 1410 using various local wireless protocols such as Wi-Fi, Bluetooth, Z-wave, Zigbee, MoCA, HomePlug (ethernet over power line), or wired protocols such as Ethernet and USB, to connect the one or more user devices 1440 and 1450 to local security and automation equipment. The one or more user devices 1440 and 1450 may connect locally to the monitoring system and its sensors and other devices. The local connection may improve the speed of status and control communications because communicating through the network 1405 with a remote server (e.g., the monitoring server 1460) may be significantly slower.

Although the one or more user devices 1440 and 1450 are shown as communicating with the control unit 1410, the one or more user devices 1440 and 1450 may communicate directly with the sensors and other devices controlled by the control unit 1410. In some implementations, the one or more user devices 1440 and 1450 replace the control unit 1410 and perform the functions of the control unit 1410 for local monitoring and long range/offsite communication.

In other implementations, the one or more user devices 1440 and 1450 receive monitoring system data captured by the control unit 1410 through the network 1405. The one or more user devices 1440, 1450 may receive the data from the control unit 1410 through the network 1405 or the monitoring server 1460 may relay data received from the control unit 1410 to the one or more user devices 1440 and 1450 through the network 1405. In this regard, the monitoring server 1460 may facilitate communication between the one or more user devices 1440 and 1450 and the monitoring system.

In some implementations, the one or more user devices 1440 and 1450 may be configured to switch whether the one or more user devices 1440 and 1450 communicate with the control unit 1410 directly (e.g., through link 1438) or through the monitoring server 1460 (e.g., through network 1405) based on a location of the one or more user devices 1440 and 1450. For instance, when the one or more user devices 1440 and 1450 are located close to the control unit 1410 and in range to communicate directly with the control unit 1410, the one or more user devices 1440 and 1450 use direct communication. When the one or more user devices 1440 and 1450 are located far from the control unit 1410 and not in range to communicate directly with the control unit 1410, the one or more user devices 1440 and 1450 use communication through the monitoring server 1460.

Although the one or more user devices 1440 and 1450 are shown as being connected to the network 1405, in some implementations, the one or more user devices 1440 and 1450 are not connected to the network 1405. In these implementations, the one or more user devices 1440 and 1450 communicate directly with one or more of the monitoring system components and no network (e.g., Internet) connection or reliance on remote servers is needed.

In some implementations, the one or more user devices 1440 and 1450 are used in conjunction with only local sensors and/or local devices in a house. In these implementations, the system 1400 includes the one or more user devices 1440 and 1450, the sensors 1420, the home automation controls 1422, the camera 1430, and the robotic devices 1490. The one or more user devices 1440 and 1450 receive data directly from the sensors 1420, the home automation controls 1422, the camera 1430, and the robotic devices 1490, and sends data directly to the sensors 1420, the home automation controls 1422, the camera 1430, and the robotic devices 1490. The one or more user devices 1440, 1450 provide the appropriate interfaces/processing to provide visual surveillance and reporting.

In other implementations, the system 1400 further includes network 1405 and the sensors 1420, the home automation controls 1422, the camera 1430, the thermostat 1434, and the robotic devices 1490, and are configured to communicate sensor and image data to the one or more user devices 1440 and 1450 over network 1405 (e.g., the Internet, cellular network, etc.). In yet another implementation, the sensors 1420, the home automation controls 1422, the camera 1430, the thermostat 1434, and the robotic devices 1490 (or a component, such as a bridge/router) are intelligent enough to change the communication pathway from a direct local pathway when the one or more user devices 1440 and 1450 are in close physical proximity to the sensors 1420, the home automation controls 1422, the camera 1430, the thermostat 1434, and the robotic devices 1490 to a pathway over network 1405 when the one or more user devices 1440 and 1450 are farther from the sensors 1420, the home automation controls 1422, the camera 1430, the thermostat 1434, and the robotic devices 1490.

In some examples, the system leverages GPS information from the one or more user devices 1440 and 1450 to determine whether the one or more user devices 1440 and 1450 are close enough to the sensors 1420, the home automation controls 1422, the camera 1430, the thermostat 1434, and the robotic devices 1490 to use the direct local pathway or whether the one or more user devices 1440 and 1450 are far enough from the sensors 1420, the home automation controls 1422, the camera 1430, the thermostat 1434, and the robotic devices 1490 that the pathway over network 1405 is required.

In other examples, the system leverages status communications (e.g., pinging) between the one or more user devices 1440 and 1450 and the sensors 1420, the home automation controls 1422, the camera 1430, the thermostat 1434, and the robotic devices 1490 to determine whether communication using the direct local pathway is possible. If communication using the direct local pathway is possible, the one or more user devices 1440 and 1450 communicate with the sensors 1420, the home automation controls 1422, the camera 1430, the thermostat 1434, and the robotic devices 1490 using the direct local pathway. If communication using the direct local pathway is not possible, the one or more user devices 1440 and 1450 communicate with the sensors 1420, the home automation controls 1422, the camera 1430, the thermostat 1434, and the robotic devices 1490 using the pathway over network 1405.

In some implementations, the system 1400 provides end users with access to images captured by the camera 1430 to aid in decision making. The system 1400 may transmit the images captured by the camera 1430 over a wireless WAN network to the user devices 1440 and 1450. Because transmission over a wireless WAN network may be relatively expensive, the system 1400 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 1430). In these implementations, the camera 1430 may be set to capture images on a periodic basis when the alarm system is armed in an "away" state, but set not to capture images when the alarm system is armed in a "home" state or disarmed. In addition, the camera 1430 may be triggered to begin capturing images when the alarm system detects an event, such as an alarm event, a door-opening event for a door that leads to an area within a field of view of the camera 1430, or motion in the area within the field of view of the camera 1430. In other implementations, the camera 1430 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A circuit for powering a video doorbell in signal communication with a chime that outputs audio in response to a button on the video doorbell being pressed, the circuit comprising:
a rectifier circuit configured to:
receive a first voltage signal generated based on a power source;
rectify the first voltage signal; and
generate a second voltage signal in response to rectifying the first voltage signal;
a boost circuit that is coupled to, and spaced apart from, the rectifier circuit and that uses the second voltage signal to generate a high-voltage direct-current (DC) signal for charging a capacitor without generating a peak current that triggers a particular noise output from the chime; and
a converter circuit that generates a low-voltage power signal based on the high-voltage DC signal and a charge stored at the capacitor,
wherein the low-voltage power signal is for powering a plurality of components of the video doorbell.

2. The circuit of claim 1, further comprising:
a regulated alternating-current (AC) power supply that generates the first voltage signal based on an AC input signal received from the power source.

3. The circuit of claim 2, wherein:
the AC input signal has a first frequency; and
the first voltage signal is an AC voltage signal that has a second frequency that is lower than the first frequency of the AC input signal.

4. The circuit of claim 2, wherein the particular noise output from the chime is a humming noise that is generated at the chime based on the peak current.

5. The circuit of claim 2, wherein:
the chime is configured to pass the first voltage signal to a portion of the circuit that is a first stage of a power supply circuit in the video doorbell; and
the first stage of the power supply circuit in the video doorbell includes the rectifier circuit.

6. The circuit of claim 2, wherein the chime is an electronic chime or a mechanical chime.

7. The circuit of claim 1, wherein:
the first voltage signal is an AC voltage signal that is input to the video doorbell to provide power to the video doorbell; and
the second voltage signal is a DC voltage signal generated by the rectifier circuit.

8. The circuit of claim 1, wherein:
the rectifier circuit is a diode bridge rectifier coupled to the capacitor by way of the boost circuit; and
the diode bridge rectifier cooperates with the capacitor to generate the DC voltage signal from the AC input signal.

9. A circuit for powering a video doorbell in signal communication with a chime that outputs audio in response to a button on the video doorbell being pressed, the circuit comprising:
a rectifier circuit configured to:
receive a first voltage signal generated based on a power source; and
generate a second voltage signal based on the first voltage signal;
a boost circuit that uses the second voltage signal to generate a high-voltage direct-current (DC) signal for charging a capacitor without generating a peak current that triggers a particular noise output from the chime,
wherein the boost circuit charges the capacitor without generating the peak current at least by charging the capacitor over a time, T1, that corresponds to a duration of a full input voltage cycle; and
a converter circuit that generates a low-voltage power signal based on the high-voltage DC signal and a charge stored at the capacitor,
wherein the low-voltage power signal is for powering a plurality of components of the video doorbell.

10. The circuit of claim 9, wherein:
the boost circuit being able to charge the capacitor without generating the peak current is based on the second frequency of the first voltage signal being lower than the first frequency of the AC input signal.

11. A method implemented using a circuit for powering a video doorbell in signal communication with a chime that outputs audio in response to a button on the video doorbell being pressed, the method comprising:
receiving, by a rectifier circuit, a first voltage signal generated based on a power source;
rectifying, by the rectifier circuit, the first voltage signal;
generating, by the rectifier circuit, a second voltage signal in response to rectifying the first voltage signal;
generating, by a boost circuit and using the second voltage signal, a high-voltage direct-current (DC) signal for charging a capacitor without generating a peak current that triggers a particular noise output from the chime, wherein the boost circuit is coupled to, and spaced apart from, the rectifier circuit;
generating, by a converter circuit, a low-voltage power signal based on the high-voltage DC signal and a charge stored at the capacitor; and
powering, by the circuit, a plurality of components of the video doorbell based on the low-voltage power signal.

12. The method of claim 11, further comprising:
generating, by a regulated alternating-current (AC) power supply, the first voltage signal based on an AC input signal received from the power source.

13. The method of claim 12, wherein the AC input signal has a first frequency and generating the first voltage signal comprises:
generating the first voltage signal as an AC voltage signal that has a second frequency that is lower than the first frequency of the AC input signal.

14. The method of claim 12, wherein the particular noise output from the chime is a humming noise that is generated at the chime based on the peak current.

15. The method of claim 12, further comprising:
passing, by the chime, the first voltage signal to a portion of the circuit that is a first stage of a power supply circuit in the video doorbell; and
wherein the first stage of the power supply circuit in the video doorbell includes the rectifier circuit.

16. The method of claim 11, wherein:
the chime is an electronic chime or a mechanical chime;
the first voltage signal is an AC voltage signal that is input to the video doorbell to provide power to the video doorbell; and
the second voltage signal is a DC voltage signal generated by the rectifier circuit.

17. The method of claim 11, wherein the rectifier circuit is a diode bridge rectifier coupled to the capacitor by way of the boost circuit and the method comprises:
generating the DC voltage signal from the AC input signal based on signal communications between the diode bridge rectifier and the capacitor.

18. A method implemented using a circuit for powering a video doorbell in signal communication with a chime that outputs audio in response to a button on the video doorbell being pressed, the method comprising:
- receiving, by a rectifier circuit, a first voltage signal generated based on a power source;
- generating, by the rectifier circuit, a second voltage signal based on the first voltage signal;
- generating, by a boost circuit and using the second voltage signal, a high-voltage direct-current (DC) signal for charging a capacitor without generating a peak current that triggers a particular noise output from the chime, wherein the boost circuit charges the capacitor without generating the peak current at least by charging the capacitor over a time, T1, that corresponds to a duration of a full input voltage cycle;
- generating, by a converter circuit, a low-voltage power signal based on the high-voltage DC signal and a charge stored at the capacitor; and
- powering, by the circuit, a plurality of components of the video doorbell based on the low-voltage power signal.

19. The method of claim 18, wherein:
the boost circuit being able to charge the capacitor without generating the peak current is based on the second frequency of the first voltage signal being lower than the first frequency of the AC input signal.

20. A non-transitory machine-readable storage device storing instructions for using a circuit to power a video doorbell in signal communication with a chime that outputs audio in response to a button on the video doorbell being pressed, the instructions being executable by a processing device to cause performance of operations comprising:
- receiving, by a rectifier circuit, a first voltage signal generated based on a power source;
- rectifying, by the rectifier circuit, the first voltage signal;
- generating, by the rectifier circuit, a second voltage signal in response to rectifying the first voltage signal;
- generating, by a boost circuit and using the second voltage signal, a high-voltage direct-current (DC) signal for charging a capacitor without generating a peak current that triggers a particular noise output from the chime, wherein the boost circuit is coupled to, and spaced apart from, the rectifier circuit;
- generating, by a converter circuit, a low-voltage power signal based on the high-voltage DC signal and a charge stored at the capacitor; and
- powering, by the circuit, a plurality of components of the video doorbell based on the low-voltage power signal.

* * * * *